(12) United States Patent
Broadstone et al.

(10) Patent No.: US 9,298,897 B2
(45) Date of Patent: Mar. 29, 2016

(54) METHOD OF AND SYSTEMS FOR PRIVACY PRESERVING MOBILE DEMOGRAPHIC MEASUREMENT OF INDIVIDUALS, GROUPS AND LOCATIONS OVER TIME AND SPACE

(71) Applicant: Skyhook Wireless, Inc., Boston, MA (US)

(72) Inventors: Andrew J. Broadstone, Watertown, MA (US); Russel Kipp Jones, Medfield, MA (US); Edward James Morgan, Needham, MA (US); Farshid Alizadeh-shabdiz, Wayland, MA (US); Nicolas Brachet, Chestnut, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 13/901,822

(22) Filed: May 24, 2013

(65) Prior Publication Data

US 2013/0340095 A1 Dec. 19, 2013

Related U.S. Application Data

(62) Division of application No. 13/530,566, filed on Jun. 22, 2012, now abandoned.

(60) Provisional application No. 61/499,975, filed on Jun. 22, 2011.

(51) Int. Cl.
*G06F 21/31* (2013.01)
*G06F 15/16* (2006.01)
(Continued)

(52) U.S. Cl.
CPC ............ *G06F 21/31* (2013.01); *G06F 21/6254* (2013.01); *G06Q 30/0261* (2013.01); *G06F 2221/2111* (2013.01)

(58) Field of Classification Search
CPC ..... H04L 67/18; H04L 63/0421; H04W 4/02; H04W 64/00
USPC .................................................... 726/26, 28
See application file for complete search history.

(56) References Cited

U.S. PATENT DOCUMENTS 4,415,771 A 11/1983 Martinez
(Continued)

FOREIGN PATENT DOCUMENTS

WO WO-2004036240 4/2004
(Continued)

OTHER PUBLICATIONS

Anonymous Usage of Location-Based Services Through Spatial and Temporal Cloaking, MobiSys 2003: The First International Conference on Mobile Systems, Applications, and Services, Usenix Association.*
(Continued)

*Primary Examiner* — Michael Chao
*Assistant Examiner* — Shu Chun Gao
(74) *Attorney, Agent, or Firm* — Cesari and McKenna, LLP; James A. Blanchette

(57) ABSTRACT

Disclosed are techniques for privacy preserving mobile demographic measurement of individuals, groups, and locations over time and space. A method of estimating demographic information associated with a user of a mobile device and/or a location while preserving the privacy of the user based at least in part on a location estimate of the mobile device of the user includes receiving an estimated geographical location of the mobile device of the user and receiving a time at which the mobile device was at the estimated geographical location. The method includes assigning substitute identifiers for the geographical location and the time at which the mobile device was at the estimated geographical location. The method includes associating the geographical areas substitute identifiers with demographic information and estimating demographic information associated with the user of the mobile device based on the substitute identifiers and based on the demographic information associated with substitute identifiers.

19 Claims, 16 Drawing Sheets

(51) Int. Cl.
*H04L 9/32* (2006.01)
*H04W 4/20* (2009.01)
*G06F 21/62* (2013.01)
*G06Q 30/02* (2012.01)

(56) References Cited

U.S. PATENT DOCUMENTS

| | | | |
|---|---|---|---|
| 4,991,176 A | 2/1991 | Dahbura et al. | |
| 5,315,636 A | 5/1994 | Patel | |
| 5,564,121 A | 10/1996 | Chow et al. | |
| 5,940,825 A | 8/1999 | Castelli et al. | |
| 5,946,615 A | 8/1999 | Holmes et al. | |
| 6,134,448 A | 10/2000 | Shoji et al. | |
| 6,249,252 B1 | 6/2001 | Dupray | |
| 6,262,741 B1 | 7/2001 | Davies | |
| 6,272,405 B1 | 8/2001 | Kubota et al. | |
| 6,438,491 B1 | 8/2002 | Farmer | |
| 6,625,647 B1 | 9/2003 | Barrick, Jr. et al. | |
| 6,665,658 B1 | 12/2003 | DaCosta et al. | |
| 6,674,403 B2 | 1/2004 | Gray et al. | |
| 6,678,611 B2 | 1/2004 | Khavakh et al. | |
| 6,741,188 B1 | 5/2004 | Miller et al. | |
| 6,757,518 B2 | 6/2004 | Spratt et al. | |
| 6,789,102 B2 | 9/2004 | Gotou et al. | |
| 6,799,049 B1 | 9/2004 | Zellner et al. | |
| 6,862,524 B1 | 3/2005 | Nagda et al. | |
| 6,888,811 B2 | 5/2005 | Eaton et al. | |
| 6,915,128 B1 | 7/2005 | Oh | |
| 6,956,527 B2 | 10/2005 | Rogers et al. | |
| 6,978,023 B2 | 12/2005 | Dacosta | |
| 7,042,391 B2 | 5/2006 | Meunier et al. | |
| 7,120,449 B1 | 10/2006 | Muhonen et al. | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,197,556 B1 | 3/2007 | Short et al. | |
| 7,206,294 B2 | 4/2007 | Garahi et al. | |
| 7,250,907 B2 | 7/2007 | Krumm et al. | |
| 7,254,405 B2 | 8/2007 | Lin et al. | |
| 7,271,765 B2 | 9/2007 | Stilp et al. | |
| 7,305,245 B2 | 12/2007 | Alizadeh-Shabdiz et al. | |
| 7,317,914 B2 | 1/2008 | Adya et al. | |
| 7,323,991 B1 | 1/2008 | Eckert et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,417,961 B2 | 8/2008 | Lau | |
| 7,433,673 B1 | 10/2008 | Everson et al. | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,636,576 B1 | 12/2009 | Pfister et al. | |
| 7,768,963 B2 | 8/2010 | Alizadeh-Shabdiz | |
| 7,769,396 B2 | 8/2010 | Alizadeh-Shabdiz et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,916,661 B2 | 3/2011 | Alizadeh-Shabdiz et al. | |
| 7,999,742 B2 | 8/2011 | Alizadeh-Shabdiz | |
| 8,014,788 B2 | 9/2011 | Alizadeh-Shabdiz et al. | |
| 8,019,357 B2 | 9/2011 | Alizadeh-Shabdiz et al. | |
| 8,022,877 B2 | 9/2011 | Alizadeh-Shabdiz | |
| 8,054,219 B2 | 11/2011 | Alizadeh-Shabdiz | |
| 8,063,820 B2 | 11/2011 | Alizadeh-Shabdiz | |
| 8,090,386 B2 | 1/2012 | Alizadeh-Shabdiz et al. | |
| 8,103,288 B2 | 1/2012 | Alizadeh-Shabdiz et al. | |
| 8,130,148 B2 | 3/2012 | Alizadeh-Shabdiz | |
| 8,144,673 B2 | 3/2012 | Alizadeh-Shabdiz | |
| 8,154,454 B2 | 4/2012 | Alizadeh-Shabdiz | |
| 8,155,666 B2 | 4/2012 | Alizadeh-Shabdiz | |
| 8,155,673 B2 | 4/2012 | Alizadeh-Shabdiz et al. | |
| 8,185,129 B2 | 5/2012 | Alizadeh-Shabdiz | |
| 8,340,685 B2 | 12/2012 | Cochran | |
| 2001/0053999 A1 | 12/2001 | Feinberg | |
| 2002/0055956 A1 | 5/2002 | Krasnoiarov et al. | |
| 2002/0080063 A1 | 6/2002 | Bloebaum et al. | |
| 2002/0154056 A1 | 10/2002 | Gaal et al. | |
| 2002/0173317 A1 | 11/2002 | Nykanen et al. | |
| 2002/0184331 A1 | 12/2002 | Blight et al. | |
| 2003/0043073 A1 | 3/2003 | Gray et al. | |
| 2003/0069024 A1 | 4/2003 | Kennedy | |
| 2003/0087647 A1 | 5/2003 | Hurst | |
| 2003/0114206 A1 | 6/2003 | Timothy et al. | |
| 2003/0125045 A1 | 7/2003 | Riley et al. | |
| 2003/0146835 A1 | 8/2003 | Carter | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0058640 A1 | 3/2004 | Root et al. | |
| 2004/0068364 A1 | 4/2004 | Zhao et al. | |
| 2004/0081133 A1 | 4/2004 | Smavatkul et al. | |
| 2004/0087317 A1 | 5/2004 | Caci | |
| 2004/0124977 A1 | 7/2004 | Biffar | |
| 2004/0157624 A1 | 8/2004 | Hrastar | |
| 2004/0162896 A1 | 8/2004 | Cen et al. | |
| 2004/0193367 A1 | 9/2004 | Cline | |
| 2004/0203847 A1 | 10/2004 | Knauerhase et al. | |
| 2004/0203904 A1 | 10/2004 | Gwon et al. | |
| 2004/0204063 A1 | 10/2004 | Van Erlach | |
| 2004/0205234 A1 | 10/2004 | Barrack et al. | |
| 2004/0263388 A1 | 12/2004 | Krumm et al. | |
| 2005/0020266 A1 | 1/2005 | Backes et al. | |
| 2005/0021781 A1 | 1/2005 | Sunder et al. | |
| 2005/0037775 A1 | 2/2005 | Moeglein et al. | |
| 2005/0043040 A1 | 2/2005 | Contractor | |
| 2005/0055374 A1 | 3/2005 | Sato | |
| 2005/0108306 A1 | 5/2005 | Martizano Catalasan | |
| 2005/0136845 A1 | 6/2005 | Masuoka et al. | |
| 2005/0164710 A1 | 7/2005 | Beuck | |
| 2005/0192024 A1 | 9/2005 | Sheynblat | |
| 2005/0227711 A1 | 10/2005 | Orwant et al. | |
| 2005/0232189 A1 | 10/2005 | Loushine | |
| 2005/0251326 A1 | 11/2005 | Reeves | |
| 2006/0002326 A1 | 1/2006 | Vesuna | |
| 2006/0009235 A1 | 1/2006 | Sheynblat et al. | |
| 2006/0040640 A1 | 2/2006 | Thompson et al. | |
| 2006/0046709 A1 | 3/2006 | Krumm et al. | |
| 2006/0058957 A1 | 3/2006 | Hickenlooper et al. | |
| 2006/0058958 A1 | 3/2006 | Galbreath et al. | |
| 2006/0061476 A1 | 3/2006 | Patil et al. | |
| 2006/0078122 A1 | 4/2006 | Dacosta | |
| 2006/0089157 A1 | 4/2006 | Casey et al. | |
| 2006/0089160 A1 | 4/2006 | Othmer | |
| 2006/0092015 A1 | 5/2006 | Agrawal et al. | |
| 2006/0128397 A1 | 6/2006 | Choti et al. | |
| 2006/0197704 A1 | 9/2006 | Luzzatto et al. | |
| 2006/0221918 A1 | 10/2006 | Wang | |
| 2006/0270421 A1 | 11/2006 | Phillips et al. | |
| 2006/0293064 A1 | 12/2006 | Robertson et al. | |
| 2007/0004428 A1 | 1/2007 | Morgan et al. | |
| 2007/0097511 A1 | 5/2007 | Das et al. | |
| 2007/0100955 A1 | 5/2007 | Bodner | |
| 2007/0110053 A1 | 5/2007 | Soni et al. | |
| 2007/0121560 A1 | 5/2007 | Edge | |
| 2007/0126635 A1 | 6/2007 | Houri | |
| 2007/0150516 A1 | 6/2007 | Morgan et al. | |
| 2007/0178911 A1 | 8/2007 | Baumeister et al. | |
| 2007/0184846 A1 | 8/2007 | Horton et al. | |
| 2007/0210961 A1 | 9/2007 | Romijn | |
| 2007/0232892 A1 | 10/2007 | Hirota | |
| 2008/0004888 A1 | 1/2008 | Davis et al. | |
| 2008/0008118 A1 | 1/2008 | Alizadeh-Shabdiz | |
| 2008/0008119 A1 | 1/2008 | Alizadeh-Shabdiz | |
| 2008/0033646 A1 | 2/2008 | Morgan et al. | |
| 2008/0045234 A1 | 2/2008 | Reed | |
| 2008/0108371 A1 | 5/2008 | Alizadeh-Shabdiz et al. | |
| 2008/0132170 A1 | 6/2008 | Alizadeh-Shabdiz et al. | |
| 2008/0133124 A1 | 6/2008 | Sarkeshik | |
| 2008/0133336 A1 | 6/2008 | Altman et al. | |

(56) References Cited

U.S. PATENT DOCUMENTS

| | | | |
|---|---|---|---|
| 2008/0139219 A1 | 6/2008 | Boeiro et al. | |
| 2008/0176583 A1 | 7/2008 | Brachet et al. | |
| 2008/0188242 A1 | 8/2008 | Carlson et al. | |
| 2008/0248741 A1 | 10/2008 | Alizadeh-Shabdiz | |
| 2008/0248808 A1 | 10/2008 | Alizadeh-Shabdiz | |
| 2008/0255944 A1* | 10/2008 | Shah et al. | 705/14 |
| 2008/0261622 A1 | 10/2008 | Lee et al. | |
| 2009/0075672 A1 | 3/2009 | Jones et al. | |
| 2009/0149197 A1 | 6/2009 | Morgan et al. | |
| 2009/0175189 A1 | 7/2009 | Alizadeh-Shabdiz et al. | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0310585 A1 | 12/2009 | Alizadeh-Shabdiz | |
| 2009/0312036 A1 | 12/2009 | Alizadeh-Shabdiz | |
| 2010/0052983 A1 | 3/2010 | Alizadeh-Shabdiz | |
| 2011/0021207 A1 | 1/2011 | Morgan et al. | |
| 2011/0035420 A1 | 2/2011 | Alizadeh-Shabdiz et al. | |
| 2011/0045840 A1 | 2/2011 | Alizadeh-Shabdiz et al. | |
| 2011/0074626 A1 | 3/2011 | Alizadeh-Shabdiz et al. | |
| 2011/0080317 A1 | 4/2011 | Alizadeh-Shabdiz et al. | |
| 2011/0080318 A1 | 4/2011 | Alizadeh-Shabdiz et al. | |
| 2011/0235532 A1 | 9/2011 | Alizadeh-Shabdiz et al. | |
| 2011/0235623 A1 | 9/2011 | Alizadeh-Shabdiz et al. | |
| 2011/0287783 A1 | 11/2011 | Alizadeh-Shabdiz et al. | |
| 2011/0298660 A1 | 12/2011 | Alizadeh-Shabdiz | |
| 2011/0298663 A1 | 12/2011 | Alizadeh-Shabdiz | |
| 2011/0298664 A1 | 12/2011 | Alizadeh-Shabdiz | |
| 2011/0306357 A1 | 12/2011 | Alizadeh-Shabdiz et al. | |
| 2011/0306358 A1 | 12/2011 | Alizadeh-Shabdiz et al. | |
| 2011/0306359 A1 | 12/2011 | Alizadeh-Shabdiz et al. | |
| 2011/0306360 A1 | 12/2011 | Alizadeh-Shabdiz et al. | |
| 2011/0306361 A1 | 12/2011 | Alizadeh-Shabdiz et al. | |
| 2012/0071175 A1* | 3/2012 | Skibiski et al. | 455/456.3 |
| 2012/0100872 A1 | 4/2012 | Alizadeh-Shabdiz et al. | |
| 2012/0108260 A1 | 5/2012 | Alizadeh-Shabdiz | |
| 2012/0112958 A1 | 5/2012 | Alizadeh-Shabdiz et al. | |
| 2012/0178477 A1 | 7/2012 | Morgan et al. | |
| 2012/0196621 A1 | 8/2012 | Alizadeh-Shabdiz et al. | |
| 2012/0284118 A1 | 11/2012 | Mamich | |

FOREIGN PATENT DOCUMENTS

| | | | |
|---|---|---|---|
| WO | WO-2007081356 | 7/2007 | |
| WO | WO-2007101107 | 9/2007 | |
| WO | WO-2011119575 | 9/2011 | |
| WO | WO-2011156549 | 12/2011 | |
| WO | WO 2012/019643 A1 * | 2/2012 | G06Q 30/00 |
| WO | WO2012019643 A1 * | 2/2012 | G06Q 30/00 |

OTHER PUBLICATIONS

Gruteser et al., Usenix Association, Proceedings of MobiSys 2003: The First International Conference on Mobile Systems, Applications, and Service, San Francisco, CA, USA, May 5-8, 2003.*

Curran, et al., "Pinpointing Users with Location Estimation Techniques and Wi-Fi Hotspot Technology," International Journal of Network Management, 2008, DOI: 10.1002/nem.683, 15 pgs.

Griswold et al., "ActiveCampus—Sustaining Educational Communities through Mobile Technology." UCSD CSE Technical Report #CS200-0714, 2002, 19 pgs.

Hazas, M., et al., "Location-Aware Computing Comes of Age," IEEE, vol. 37, Feb. 2004, pp. 95-97.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

International Search Report and Written Opinion of the International Searching Authority, The United States Patent and Trademark Office, for International Application No. PCT/US2006/06041, dated Nov. 16, 2007, 4 pgs.

International Search Report and Written Opinion of the International Searching Authority, the United States Patent and Trademark Office, for International Application No. PCT/US2008/058345, dated Jun. 30, 2008, 6 pgs.

International Search Report and Written Opinion of the International Searching Authority, the United States Patent and Trademark Office, for International Application No. PCT/US2010/045438, dated Oct. 6, 2010, 9 pgs.

International Search Report and Written Opinion of the International Searching Authority, the United States Patent and Trademark Office, for International Application No. PCT/US2011/029379, dated Jun. 1, 2011, 15 pgs.

International Search Report and Written Opinion of the International Searching Authority, The United States Patent and Trademark Office, for International Application No. PCT/US2011/039717, dated Dec. 20, 2011; 13 pgs.

International Search Report and Written Opinion of the International Searching Authority, the United States Patent and Trademark Office, for PCT/US2006/07299, dated Feb. 11, 2008, 7 pgs.

International Search Report and Written Opinion of the Searching Authority, the United States Patent and Trademark Office, for International Application No. PCT/US2006/045327, dated Jun. 24, 2008, 6 pgs.

International Search Report and Written Opinion, International Patent Application No. PCT/US08/87969, mailed Mar. 10, 2009, 7 pgs.

International Search Report, International Application No. PCT/US05/39208, mailed Jan. 29, 2008, 3 pgs.

International Search Report, International Application No. PCT/US07/62721, mailed Nov. 9, 2007. 3 pgs.

Kawabata, K. et al., "Estimating Velocity Using Diversity Reception," IEEE, 1994, pp. 371-374.

Kim, M., et al., "Risks of using AP locations discovered through war driving,"; Pervasive Computing, May 19, 2006, pp. 67-81.

Kirsner, S., "One more way to find yourself," The Boston Globe, May 23, 2005, Retrieved from www.boston.com, 2 pgs.

Krumm, J., et al., "LOCADIO: Inferring Motion and Location from WLAN Signal Strengths," Proc. of Mobiquitous, Aug. 22-26, 2004, 10 pgs.

LaMarca, A., et al., "Place Lab: Device Positioning Using Radio Beacons in the Wild,"; Pervasive Computing, Oct. 2004, pp. 116-133.

LaMarca, A., et al., "Self-Mapping in 802.11 Location Systems," Ubicomp 2005: Ubiquitous Computing, Aug. 23, 2005, pp. 87-104.

Muthukrishnan, K., et al., "Towards Smart Surroundings: Enabling Techniques and Technologies for Localization," Lecture Notes in Computer Science, vol. 3479, May 2005, 11 pgs.

Schilit, et al., "Challenge: Ubiquitous Location-Aware Computing and the "Place Lab" Initiative," WMASH'03, Sep. 2003, San Diego, CA, 7 pgs.

Supplementary European Search Report for European Application No. 07757413, dated Apr. 6, 2010, 10 pgs.

Written Opinion of the International Searching Authority, International Application No. PCT/US05/39208, mailed Jan. 29, 2008, 3 pgs.

Zhou, R. "Wireless Indoor Tracking System (WITS)," Jul. 2006, retrieved on May 11, 2011 from the internet: URLhttp://www.ks.uni-freiburg.de/assist/rui/index.php?page=publications, 15 pgs.

* cited by examiner

1400

Location Demographic Profile Output Record 1401

| | |
|---|---|
| Geometry: | ABAF007 |
| Hour of week: | 57 |
| Confidence: | 85 |
| Attributes: | |
|     AttributeName: | Education |
|     Buckets: | |
|         Bucket: | High School |
|         Value: | 0.375 |
|         Bucket: | Bachelors |
|         Value: | 0.525 |
|         Bucket: | PhD |
|         Value: | 0.1 |

METHOD OF AND SYSTEMS FOR PRIVACY PRESERVING MOBILE DEMOGRAPHIC MEASUREMENT OF INDIVIDUALS, GROUPS AND LOCATIONS OVER TIME AND SPACE

CROSS-REFERENCE TO RELATED APPLICATIONS

This application is a divisional of U.S. patent application Ser. No. 13/530,566, filed on Jun. 22, 2012, entitled Method of and Systems for Privacy Preserving Mobile Demographic Measurement of Individuals, Groups and Locations Over Time and Space, which claims the benefit under 35 U.S.C. §119(e) of U.S. Provisional Patent Application Ser. No. 61/499,975, filed on Jun. 22, 2011, entitled Method of and Systems for Privacy Preserving Mobile Demographic Measurement of Individuals, Groups and Locations Over Time and Space, each herein incorporated by reference in its entirety.

This application is related to U.S. patent application Ser. No. 13/252,685, entitled Method of and System for Estimating Temporal Demographics of Mobile Users, filed Oct. 4, 2011, which is incorporated by reference herein.

BACKGROUND OF THE INVENTION

1. Field of Invention

The present disclosure is in the field of demographic, psychographic, and behavioral profiling of individuals and locations based on mobile device movement. The present disclosure includes methods of obtaining both individual and location profiles while preserving the privacy of the individuals.

2. Description of Related Art

Advertisers, marketers, and businesses attempt to match their products with the most likely buyers of the product. In order to do this, they use information such as the age, the buying power, the activities, and many other demographic, psychographic, and behavioral information on an individual or a group of individuals to ensure the best target audience for their product.

Traditionally in the US, demographic information has been provided by the US Census. This information attempts to measure many attributes of small geographical areas based on household data. This provides a base level of demographic information related to the persons who live in a given area. Over the years, various methods and information sources have been proposed and used to enhance the accuracy and specificity with which this information can be applied to individuals and groups.

Web sites and online web usage tracking has added a new dimension to the toolbox for these would-be marketers. By utilizing techniques such as browser 'cookies', the profile of an online user can be augmented based on their online behavior and the sites that they visit.

As more and more people make use of smart phones and other mobile devices equipped with the capability to determine location, yet another set of identifiable information can be added to the mix. In particular, the time and location of the device itself can be used to estimate many characteristics of that device's user. By determining the demographics of the locations, venues, and times at which these destinations are visited, it is possible to build more detailed estimations of the individual's demographic, psychographic and behavioral characteristics (See US 2002/0111172 A1, DeWolf, et al).

At the same time, by analyzing the various device profiles at a given place and time, the class or classes of people that are at a location can be computed. This becomes a demographic profile of that place at a given time.

For the purposes of this disclosure, the term "demographic profile" refers to a set of attributes describing the user of a device (the device demographic profile, or DDP) or the group of people that visit a particular location (the location demographic profile, or LDP). This set of attributes may include, but is not limited to, age, gender, ethnic background, income, years of education, as well as behavioral descriptors, such as "frequent traveler" or "retail shopper".

Demographic profile data for where people live (the LDP) has been widely available for decades. Direct marketing firms and others have compiled data from public and private sources to build profiles of neighborhoods. Public data sources include the U.S. Census, public record filings about home purchases, and records on public infrastructure such as water systems. Private sources include shipping and purchase records, magazine and newspaper subscriptions, and voluntary surveys.

LDPs are available for nearly every residential block in the U.S. Some vendors of demographic profile information further categorize neighborhoods according to the mix of different behavioral types based on the mix of these attributes—labeling combinations of attributes with names like "urban achievers." Together these data sources have given marketers a way to target households for various offers by direct mail and telephone, providing vendors an easy way to send their catalogs only to highly educated parents under 45 who live in the suburbs, for example.

While much is known about the LDP of a block of homes, which can be characterized as the static or unchanging demographic profile of a place, it has been discovered that little is known about where the people living there go during the day, which can be characterized as the dynamic or changing LDP. Some companies have surveyed users to determine this information, and extrapolated from these limited samples. This can give some broad general understanding of where some people work during the day, but cannot resolve how the LDP changes during the day, or over the course of a week, for example. Commercial and urban areas in particular, where the demographic mix changes significantly with time of day or day of week, cannot be described by current demographic profile data sources. Companies evaluating these areas for retail expansion or outdoor advertising have very little information on which to base large financial commitments.

User demographic profiles, not associated with one's home, are frequently collected using purchasing and shipping records, web browsing histories, and other records related to computer usage. An example of this is the user profile data collected in web browser "cookies", which are special files many web sites use to store information about users based on pages they have visited. These files are stored on the user's computer and submitted to the site with every page request or view. Online user demographic profiles are generally computed without considering their location or their current activity.

BRIEF SUMMARY OF THE INVENTION

In one aspect, the invention features methods of and systems for privacy preserving mobile demographic measurement of individuals, groups and locations over time and space.

In another aspect of the invention, a method of estimating demographic information associated with a user of a mobile device while preserving the privacy of the user based at least in part on a location estimate of the mobile device of the user includes receiving an estimated geographical location of the mobile device of the user and receiving a time at which the mobile device was at the estimated geographical location. The method also includes providing a set of substitute identifiers for a corresponding set of at least one geographical area, assigning one of the set of substitute identifiers for the geographical area corresponding to the geographical location of the mobile device, and assigning a substitute identifier for the time at which the mobile device was at the estimated geographical location. The method further includes providing an association between the substitute identifiers for geographical areas and demographic information corresponding to the substituted geographical area and estimating demographic information associated with the user of the mobile device based on the assigned substitute identifiers and based on the demographic information associated with the provided set of substitute identifiers.

In a further aspect of the invention, the method further includes estimating the received geographical location associated with the mobile device of the user.

In yet another aspect of the invention, the method includes recording the estimated demographic information associated with the user of the mobile device in a device demographic information log. Optionally, the method also includes estimating demographic information associated with at least one geographical area of the set of geographical areas based on the demographic information recorded in the device demographic information log. The device demographic information log contains a plurality of records of estimated demographic information associated with a plurality of mobile devices.

In another aspect of the invention, the method includes sending the estimated demographic information to the mobile device.

In still a further aspect of the invention, the substitute identifier for the geographical area corresponding to the geographical location of the mobile device that is assigned identifies a particular set of demographic information.

In an aspect of the invention, the substitute identifier for the geographical area corresponding to the geographical location of the mobile device that is assigned is reduced in specificity relative to the estimated geographical location of the mobile device.

In another aspect of the invention, the substitute identifier for the time at which the mobile device was at the estimated geographic location is a measure of time that is reduced in specificity relative to the time that was received. Optionally, the substitute identifier for the time at which the mobile device was at the estimated geographic location is a representation of time lacking date information, a time range, and/or an hour of a week designation.

In still another aspect of the invention, the estimating demographic information associated with the user of the mobile device is performed on a separate computer system from a computer system performing any one or a subset of the other steps. Optionally, the separate computer system, relative to the computer system performing any one or a subset of the other steps, is maintained in a separate network, maintained in a separate building, and/or maintained by a separate operational entity.

In another aspect of the invention, a method of estimating demographic information associated with a geographical area and a time period based on demographic information associated with users of mobile devices within the geographical area includes providing a set of geographical areas and providing a set of time periods. The method also includes receiving an estimated geographical location of a mobile device of the user, receiving a mobile device identifier that is associated with the mobile device, and receiving a time at which the mobile device was at the estimated geographical location. The method further includes determining the geographical area of the set in which the estimated geographical location occurs, determining the time period of the set in which the time at which the mobile device was at the estimated geographical location occurs, and retrieving information representative of demographic information associated with the user of the mobile device based on the mobile device identifier. The method also estimates demographic information associated with the determined geographic area during the determined time period based on the retrieved information representative of demographic information associated with the user of the mobile device.

In a further aspect of the invention, the method also includes estimating the received geographical location of the mobile device of the user.

In still another aspect of the invention, the method also includes providing a set of initial demographic information associated with the determined geographical area. The estimating demographic information associated with the determined geographic area is further based on the initial demographic information. Optionally, the method also includes, subsequent to the estimating demographic information associated with the determined geographical area, adjusting the initial demographic information based on the estimated demographic information. Also optionally, the initial demographic information is based on governmental census information, public record information, shipping and purchase records, magazine and newspaper subscriptions, voluntary surveys, and/or records of social media activity.

In yet another aspect of the invention, the method also includes sending the estimated demographic information to the mobile device.

In another aspect of the invention, the geographical areas of the set are reduced in specificity relative to the estimated geographical location of the mobile device.

In a further aspect of the invention, the time periods of the set are reduced in specificity relative to the time that was received. Optionally, the time periods of the set are a representation of time lacking date information, a time range, and/or an hour of a week designation.

In still another aspect of the invention, the estimating demographic information associated with the determined geographic area during the determined time period is performed on a separate computer system from a computer system performing any one or a subset of the other steps. Optionally, the separate computer system, relative to the computer system performing any one or a subset of the other steps is maintained in a separate network, maintained in a separate building, and/or maintained by a separate operational entity.

In another aspect of the invention, the method also includes performing selected steps a plurality of times for different mobile devices of different users and recording sets of information for the determined geographical areas, determined time periods, and retrieved information representative of demographics information associated with the users of the mobile devices in a device demographic information log. The estimating demographic information associated with the determined geographical area during the determined time period is further based on a plurality of the sets of information in the device demographic information log.

BRIEF DESCRIPTION OF THE SEVERAL VIEWS OF THE DRAWINGS

FIGS. 13A and 13B depict a modified embodiment of FIG. 11 showing additional detail with respect to the data elements used for privacy preserving purposes.

DETAILED DESCRIPTION OF THE EMBODIMENTS

Figure 1:
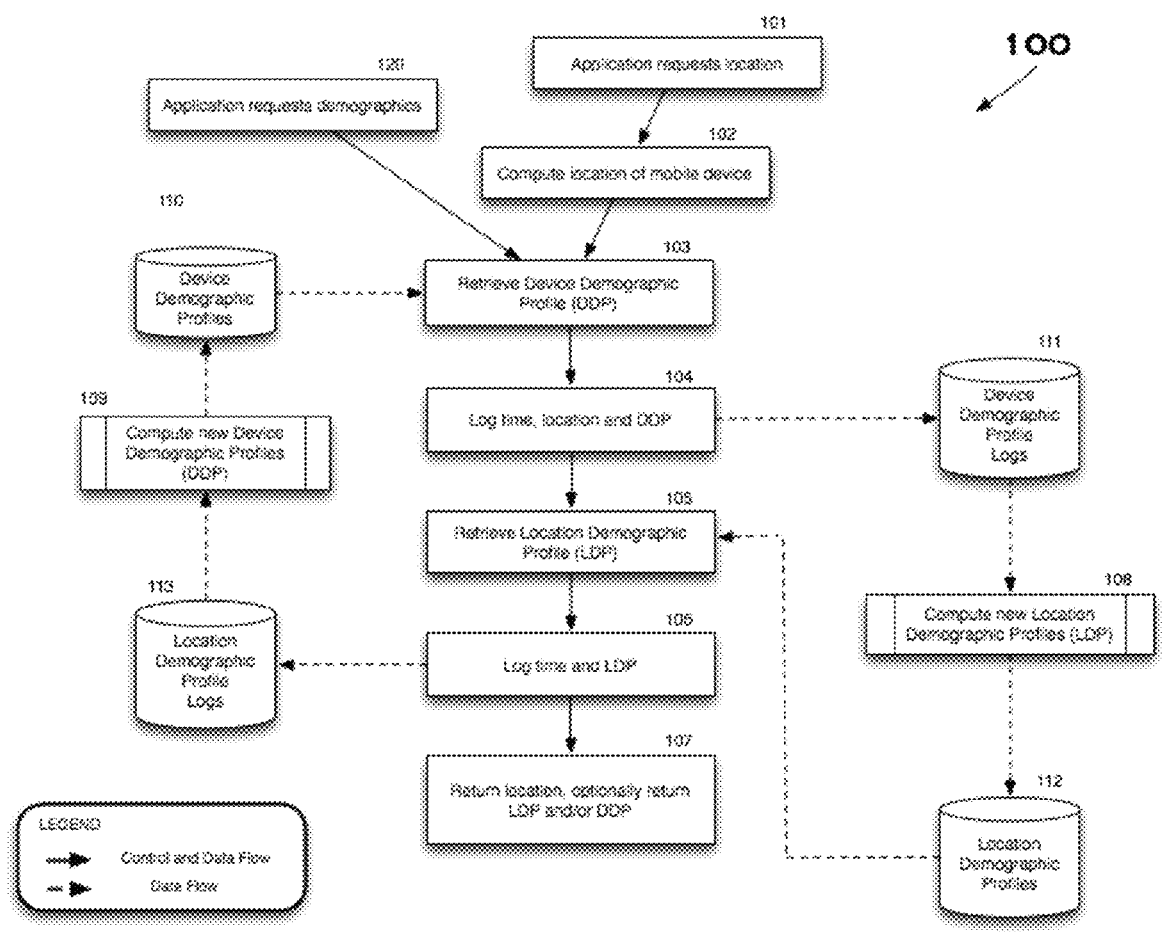
FIG. 1 shows a general flow chart of the process of embodiments of the present invention.

As used herein, the term "demographics" means statistical data describing a population. Demographics or demographic data includes, but is not limited to average age, income, education, ethnicity, gender, disabilities, mobility, educational attainment, home ownership, employment status, etc. It also may include psychographic data such as the values, attitudes, moods and interests of a population. It also may include activity, venue, and points of interest details that further describe a population or a location. The data may be time dependent with trending attributes.

As used herein, the term "demographic attribute" indicates a specific measure of demographics, for example, gender. Each attribute may have many "buckets" which represent the possible categories for a given attribute. For example, the attribute gender could have two buckets, male and female. Each of these buckets could indicate the ratio or percent of the population that fall within the definitions for each bucket.

As used herein, the term "Location Demographic Profile" or "LDP" means the composite or aggregate statistics of a population based on a specific location or geographical area.

As used herein, the term "Device Demographic Profile" or "DDP" means the composite or aggregate statistics of a Device and, by proxy the device owner or operator(s), based on a set of inputs including the aggregate set of LDPs in which the device has been observed.

As used herein, the terms "Canonical Week" and "Hour of the Week" refer to the 168 hours of a week starting with hour 0 at Sunday 12 AM and continuing through Saturday 11 PM.

Mobile phones equipped with GPS and other location technologies provide a new opportunity for discovering user information. Location trace information can be used to augment observations about what web pages a user visits or what mobile applications a user employs with respect to time and place. Behavioral and demographic attributes of a user can be inferred based on where he or she goes if a complete map trace is stored. Venues and Points of Interest (POIs) and their demographic tendencies can also be used to contribute to understanding an individual's proclivities. In addition, geotagged social activity (for example, Twitter posts) can provide more social, demographic, activity, and behavior information about a place in time.

Individual profiling can be used to present relevant advertising and content, both physical and electronic, to individuals. Location profiling can be used to make intelligent decisions about physical places by knowing what kind of people visit a place throughout the day, for example decisions about the best place for retail expansion or outdoor advertising. Such profiling, however, can raise general privacy concerns for the individual, since the location of the individual can tell a lot about the person.

Tracking of individuals, even without knowledge of their Personally Identifiable Information (e.g. Name, Social Security Number, Address, etc.), presents potential risks to the privacy of individuals. In particular, location information about individuals in which time sequence is maintained and which has high enough spatial precision, can uniquely identify an individual. Linking these unique traces to a specific named person is quite achievable in today's environment of "Big Data", data that is easily accessed and searched.

Individual location traces provide enough information to identify the home and work place of individuals. It has been shown in Golle & Partridge, *On the anonymity of home, work location pair* (Golle, P.; Partridge, K. On the anonymity of home, work location pairs. Proceedings of the 7th International Conference on Pervasive Computing; 2009 May 11-14; Nara, Japan. Berlin: Springer; 2009; LNCS 5538: 390-397), that having this information, even at the spatial resolution of a Census Block, uniquely identifies individuals.

In order to preserve user privacy, a vendor may choose not to collect any location trace information or associate a unique identifier with any individual locations. However, this makes it very difficult to associate any kind of description or category with a device, since there is no history whatsoever stored about it.

Embodiments of the present invention disclose methods of and systems for aggregating location and demographic information of individual device users and locations, thereby enabling the various use cases associated with this information, while also preserving the privacy of the individual. Embodiments of the present invention provide a set of methods to preserve the privacy of individuals while computing a Device Demographic Profile based on the Location Demographic Profiles of locations visited by that device. In particular the methods disclosed provide techniques for computing the DDP without storing a location trace of an individual.

Further, dynamic LDPs can then be determined using a collection of DDPs that visit a location at a particular time of day. These dynamic LDPs can be computed for various scales of time and space.

In broad terms, embodiments of the present invention include a method and systems to build and maintain demographic estimates of mobile device owners while preserving the anonymity and privacy of the individual. This information is then used to establish dynamic or time-varying demographic information related to a location. Through the use of mobile computing devices in concert with location services, device and location demographic profiles can be computed in a time varying manner without compromising individual privacy.

Embodiments of the invention determine a Device Demographic Profile based on where that device goes—the interaction with Location Demographic Profiles and potentially other DDPs the device comes near physically—without storing locations, or any trace that would allow discovery of where the device actually went before or after the fact. The only thing stored is the set of demographic attributes for the device (the DDP) and for the location (LDP). No latitude or longitude or description of a location that could uniquely identify a particular point on a map is stored in concert with a unique ID.

In the first embodiment, the DDP is determined based on the location a device visits at certain times of day. For example, when a phone is used to query location in the evening or at night, for the purpose of looking at a map, or posting a message to a social network, or any other purpose, a simple technique could assume that this is the home demographic of the user, for example. (More sophisticated technique can be created which use statistical measures of time and space to determine demographic clusters and reason as to which of these clusters represent the home demographic profile.) The base Location Demographic Profile for this "home zone" or a set of LDPs chosen for other significance can then be combined to create a DDP. Other LDPs the device encounters can be used to adjust the DDP over time. Embodiments of the present invention determine a DDP without a stored location history thus preserving user anonymity.

The present illustrative embodiment uses at least three inputs plus an optional additional input. These include the current location as a latitude and longitude point with error probability. The second necessary input includes the available LDPs for the currently or recently visited locations (which may be based on data from the U.S. Census, for example). Third, the current local time, where local is defined relative to the current location. Lastly, the existing DDP as previously computed is an optional input.

LDPs are initially populated with currently available, static or non-moving place-based demographic data, for example demographic data available from the U.S. Census, but also from other data sources. They may also be extrapolated from neighboring LDPs if not enough data is available for a particular location from other sources. An extrapolation between two areas can be performed in much the same way that a linear interpolation can be performed between two points on a line, taking into account the 2-dimensional nature of the area. The present embodiment adjusts LDPs over time based on the DDPs that visit that location. A feedback mechanism is established that adjusts DDPs and LDPs over time, improving their quality. Individual LDPs are stored for each time of day at a particular place. Additional distinct DDPs can be created and stored which represent various classes or periods of time. This could include such classifications as weekends, morning, lunchtime, afternoon, happy hour, evening, witching hour, etc., and can be defined by any arbitrary block or blocks of time.

The methods that contribute to the privacy preserving nature of the present invention include A) reducing the specificity of information, B) converting from spatial dimensions to demographic dimensions, C) separating operational domains, D) implementing cryptographic isolation between operational domains, and E) applying probabilistic techniques to further isolate information. These methods contribute to the privacy preserving nature while maintaining the ability to compute DDPs and LDPs while providing the facility to continually add new sources of base demographic or 'location' information.

In one embodiment, the specificity of certain information is reduced. This information includes exchanging the hour of the week in place of the specific local time. This reduces the ability to time sequence a set of observations. This substitution is carried out throughout the entirety of the process.

In certain embodiments the conversion from spatial dimensions (e.g. latitude and longitude) to demographic dimensions (e.g. age, gender, etc.) occurs at the initial observation. Converting the information early in the process allows the location to never be stored. In other embodiments, the conversion occurs at a later time and before storage of the information.

In one embodiment, the system is comprised of at least two operational domains. The separation of the operational control provides the ability to reduce information knowledge within each domain. Thus, information that, for example, could link a device with a hashed Device ID is only known in one domain, while information that could link a hashed Device ID to a demographic Profile is only known in the other domain.

Additionally, the separation of operational domains allows the use of cryptographic techniques to secure private information within one domain from being shared with the other domain. In one embodiment this can be used to create opaque strings which contain very little information for any entity not in possession of the key.

The use of probabilistic techniques provides another method to increase the privacy of individuals. In one embodiment, probabilistic techniques allow the identification of uniqueness without the ability to determine which of the total set is observed. This technique can be applied, for example, in counting unique devices that appear within a specific spatial area in a specific amount of time without compromising the privacy of an individual.

Referring now to embodiments of the invention in more detail, FIG. 1 provides an illustrative example of a dynamic demographic information flow 100. It depicts the overall flow of processing and data flow for an embodiment. A software application (generally running on a mobile computing device) requests the location of the device 101. This request triggers the retrieval of the current Device Demographic Profile (DDP) 103. It then computes the location of the device through any of a number of means (e.g. GPS or Wi-Fi positioning) 102. This information including the timestamp, latitude, longitude and DDP, is logged to the Device Demographic Profile Logs 111 (step 104). In order to ensure privacy of the device and subsequently to the end user of the device, no device identifying information is stored in 111.

Continuing in FIG. 1, the current Location Demographic Profile (LDP) is retrieved 105 from the Location Demographic Profiles database 112. This information is then logged in the Location Demographic Profile Log 113 (step 106). Information stored in this database includes the timestamp of the request, the location latitude and longitude as well as the current LDP for that location. The location and optionally the LDP and DDP are returned to the calling application by 107.

Also depicted in FIG. 1 are two processes which do not have to execute in-line or synchronously with the control flows within FIG. 1. These include the computation of the new Device Demographic Profiles 109 and the computation of the new Location Demographic Profiles 108. These will be described further in subsequent figures.

In addition, the above steps can be initiated by an express request for demographic information determination by an application (step 120).

Figure 2:
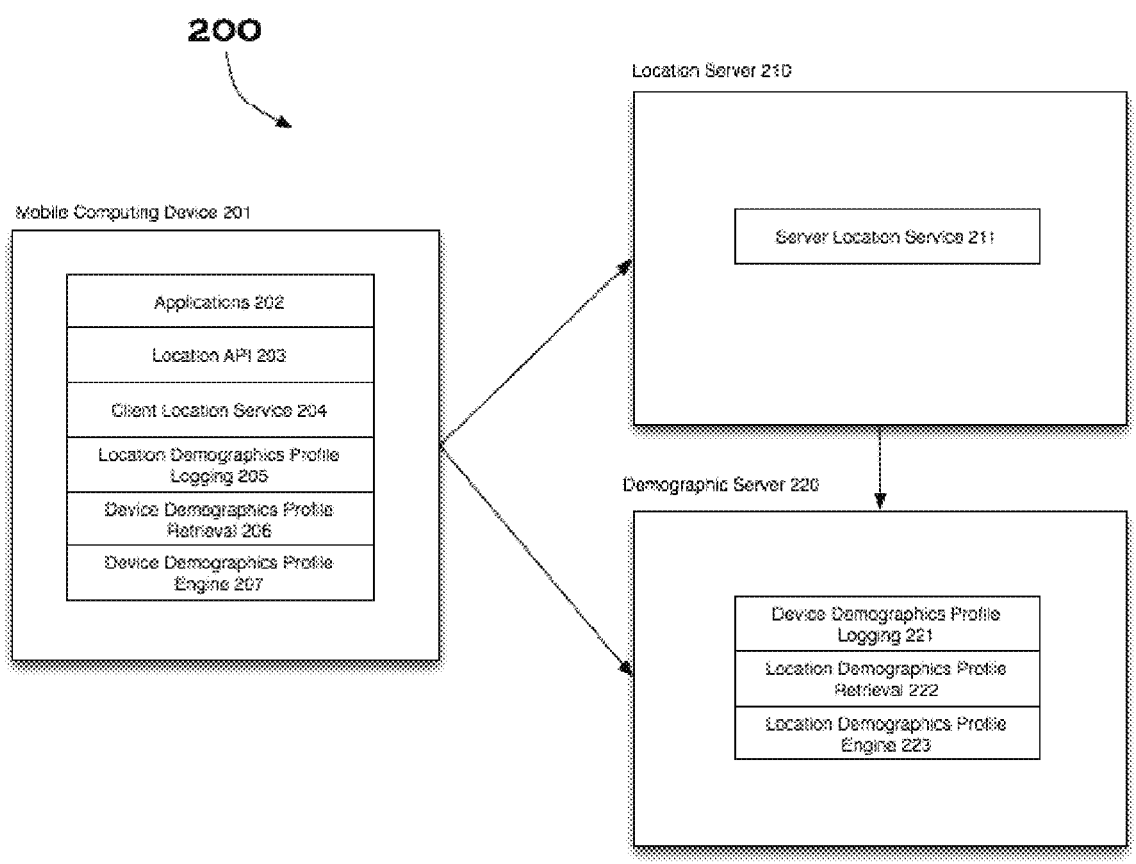
FIG. 2 shows one embodiment of a deployment of the present invention.

Continuing to describe embodiments of the invention in more detail, in FIG. 2 is one embodiment 200 of the invention in which there is a Mobile Computing Device 201, which contains Applications 202. Many applications on mobile devices require location information to be useful or to enhance the functionality of the application. Mobile devices provide a Location API 203, which allows applications to retrieve an estimate of the current location of the device, which, in some embodiments uses a Client Location Service 204 on the device. Embodiments of the present invention extend the capability of a mobile device by adding Location Demographic Profile Logging 205, Device Demographics Profile Retrieval 206 and Device Demographics Profile Engine 207. Additional functionality are included on a server are grouped within the Demographic Server 220. Components of 220 include the Device Demographics Profile Logging 221, the Location Demographic Profile Retrieval 222 and the Location Demographics Profile Engine 223. The new components will be described in more detail in subsequent figures. Additionally, the invention, in one embodiment, extends existing Location Servers 210 by augmenting the Server Location Service 211 to make a call to the Demographic Server 220.

Figure 3:
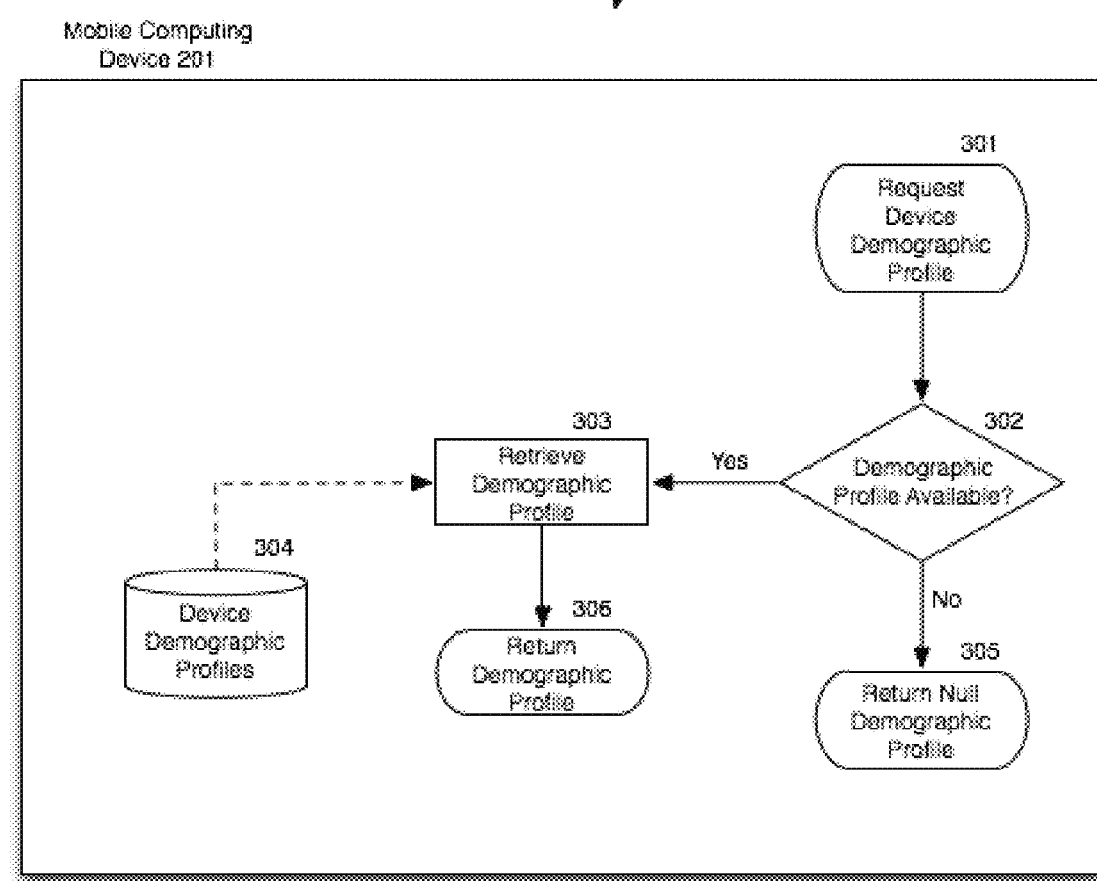
FIG. 3 shows one embodiment of a detailed example of demographic profile retrieval as deployed on a mobile computing device as per FIG. 2.

FIG. 3 is one embodiment of the Device Demographic Profile Retrieval 206. This figure depicts the process by which a Device Demographic Profile (DDP) is retrieved from the Device Demographic Profiles database 304. This process is activated, e.g., when a location request is made by an application (step 101 of FIG. 1). Referring to FIG. 3, the request 301 is received and a query is performed to determine if a qualified DDP is available 302. The qualification criteria are dependent on several factors including the number of samples that have been collected, the cluster of these samples over time and similar Location Demographic Profiles, and the stability of the sample set with respect to change over time. For example, if a particular sample set shows a rate of change greater than a particular threshold or measure, it can be deemed to be too dynamic to be relied upon. If a qualified DDP is available, it is returned (steps 303 and 306). In the event that a qualified DDP is not available, a null DDP will be returned 305.

Figure 4:
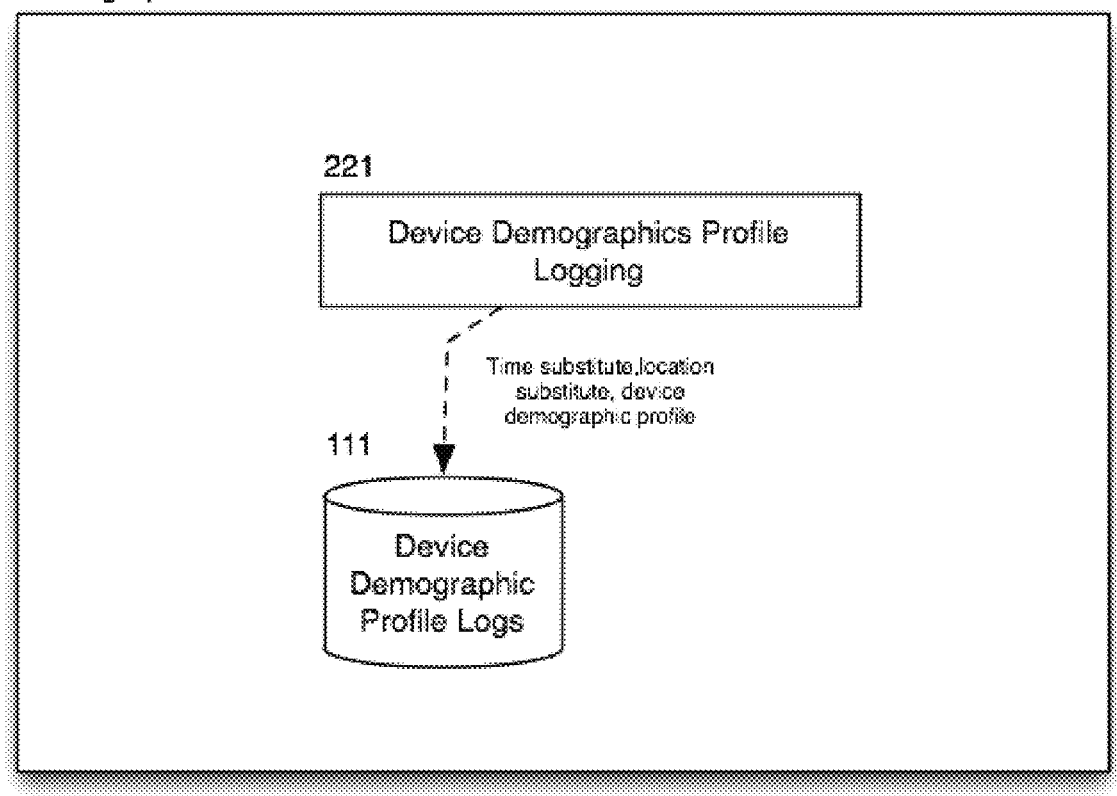
FIG. 4 shows a detailed view of one implementation of data storage on the server for embodiments of the present invention.

Continuing with FIG. 4, an embodiment of the process by which information is gathered about the demographics of devices (and by proxy the end user of such devices) that visit different locations is described. In particular, each time a location request is made from a device with a qualified DDP, the DDP along with a timestamp or time substitute (such as the hour of the week) and the geographical location or a location substitute (such as a geographic geometry) of the device is captured in the Device Demographic Profile Logs 111 by the Device Demographics Profile Logging 221 process. To preserve device anonymity, no device or personal identifying information is logged thus eliminating the ability to track or even identify which device made any particular request.

Figure 5:
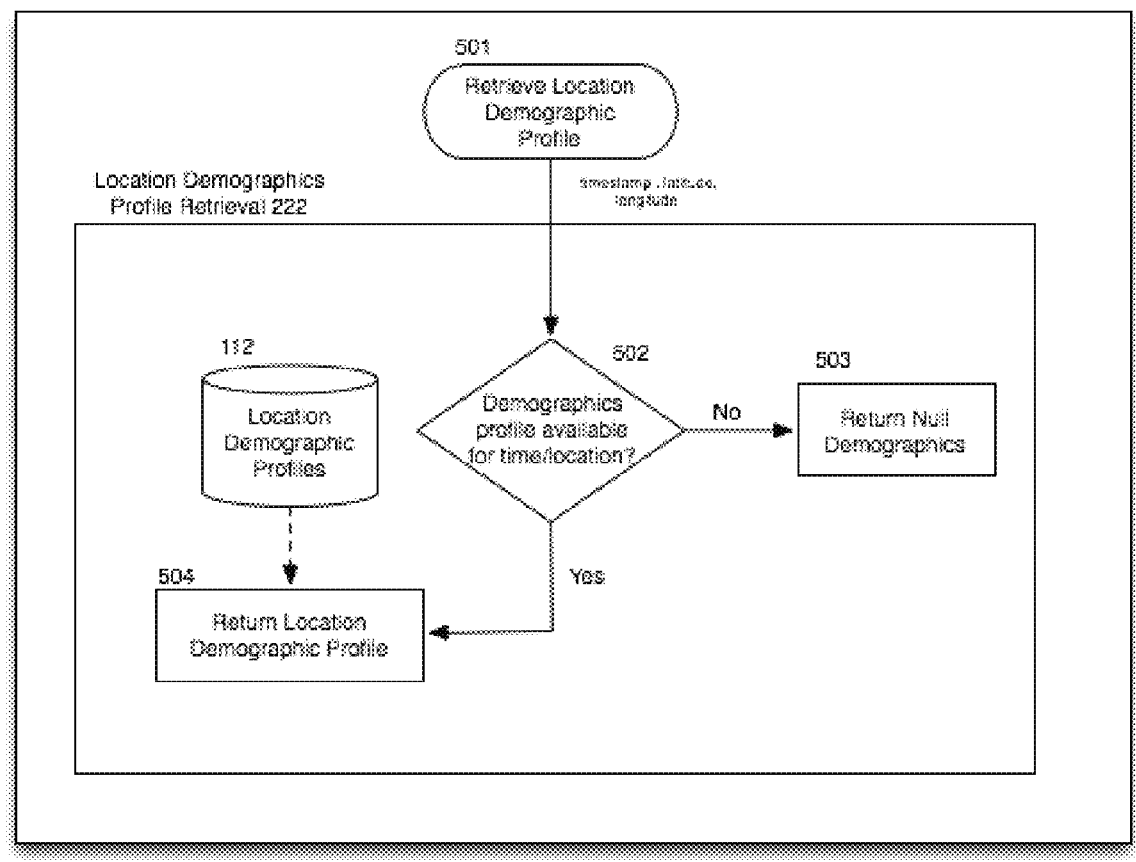
FIG. 5 shows a flow chart of the process of retrieving the demographic attributes of a given location for a specific time.

FIG. 5 describes the process 222 of retrieving a specific Location Demographic Profile (LDP). This information is retrieved in order for the techniques to build a history of demographic information about where the device has been observed. A request to retrieve an LDP is received 501. A query is performed 502 to determine if an appropriate LDP is available for the location of the mobile computing device. The LDP may represent a generalized perspective of the demographic makeup of the location or, for example, it may be specific to the hour of the day and the day of the week. If an appropriate LDP is available, it is returned 504, if an appropriate LDP is not present (for example if no devices with known LDPs have visited the location), one may be extrapolated from neighboring LDPs, or a null LDP may be returned by 503.

Figure 6:
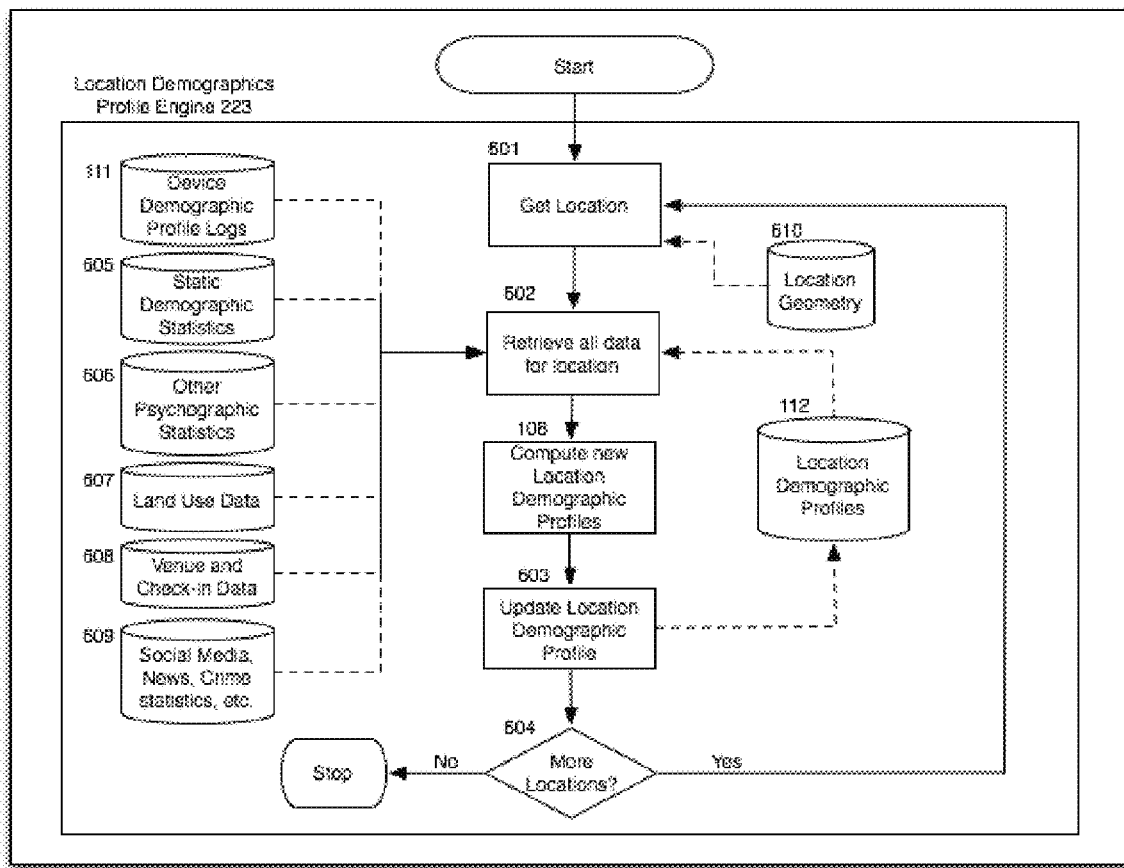
FIG. 6 shows a flow chart of one embodiment of the process to compute the Location Demographic Profiles.

FIG. 6 represents a process performed according to embodiments of the present invention. The Location Demographic Profile Engine 223 process flow is depicted and describes a method by which various data sources can be combined to create a set of Location Demographic Profiles (LDPs). Each location can have multiple LDPs based on, for example, each hour in the canonical week, the time of day, the day of week, the day of the year, or the season of the year. These demographics are compiled and computed for each location by the depicted process.

Continuing to refer to FIG. 6, a process to determine the LDPs of one or more locations is initiated. This initiation can happen in real-time based on some event or it can occur in an off-line mode, asynchronous to the operation of the general flow of the mobile device location and demographic requests. For each location that requires a new determination, the location geometry is retrieved from the Location Geometry database 610 (step 601). The location geometry allows the process to retrieve all relevant information related to that location (where location geometry is simply a portioning of areas in the overall space). This information can include many different and varied data from disparate sources such as Demographic Profile Logs 111 from the present embodiment, Static Demographic Statistics 605 which may come from sources such as the US Census, Other Psychographic Statistics 606 such as interests, activities and opinions of the population that frequents the location, Land Use Data 607 which can help identify the types of activity present at the location as well as the expected influx/efflux of people to the location, Venue and Check-in data 608 which can provide insight into both the type and frequency of activities in the location, Social Media, News, Crime statistics, etc. 609. These alternate sources can provide meaningful measures of activity, inclinations, safety and many other elements that may influence the LDP of the location.

Continuing to refer to FIG. 6, once the various records related to the location L are gathered (step 602), this information is then processed to compute the new LDPs for the location 108. One embodiment of the technique combines this information using the following technique.

First, given sufficient Device Demographic Profile samples within the location, for each hour of each day of the week (e.g. Monday at 8 AM), compute the Mobile Demographic Profile for location L by averaging the DDPs within each of the 168 weekly hours.

Next, determine other hourly statistics (e.g. for social media, these values may change over time and will need to be recomputed).

Next, combine the Mobile Demographic Profile information with the hourly statistics which represent the dynamic demographics.

Next, summarize all other static attributes (e.g. Census Data) as the static demographics.

Next, determine R, the mobile to static ratio for the location L. For example, this can be determined by combining Venue (608), Land Use (607), and Demographic (605) data to estimate the ratio of residents to visitors at the location at the a given time.

Next, use the ratio R to determine the influence of the dynamic demographics D on the static demographics S. For the set of attribute A that are mutual in these sets, A=(R*S+1/R*D). For those attributes that are exclusive to any of sets, use the values of these attributes as the final values for the LDPs of the location L.

To complete the discussion of FIG. 6, once the new LDPs have been computed for the location L, they are used to update the Location Demographic Profiles database 112 (step 603).

The process is repeated while there are additional locations L that need to be computed (step 604).

Figure 7:
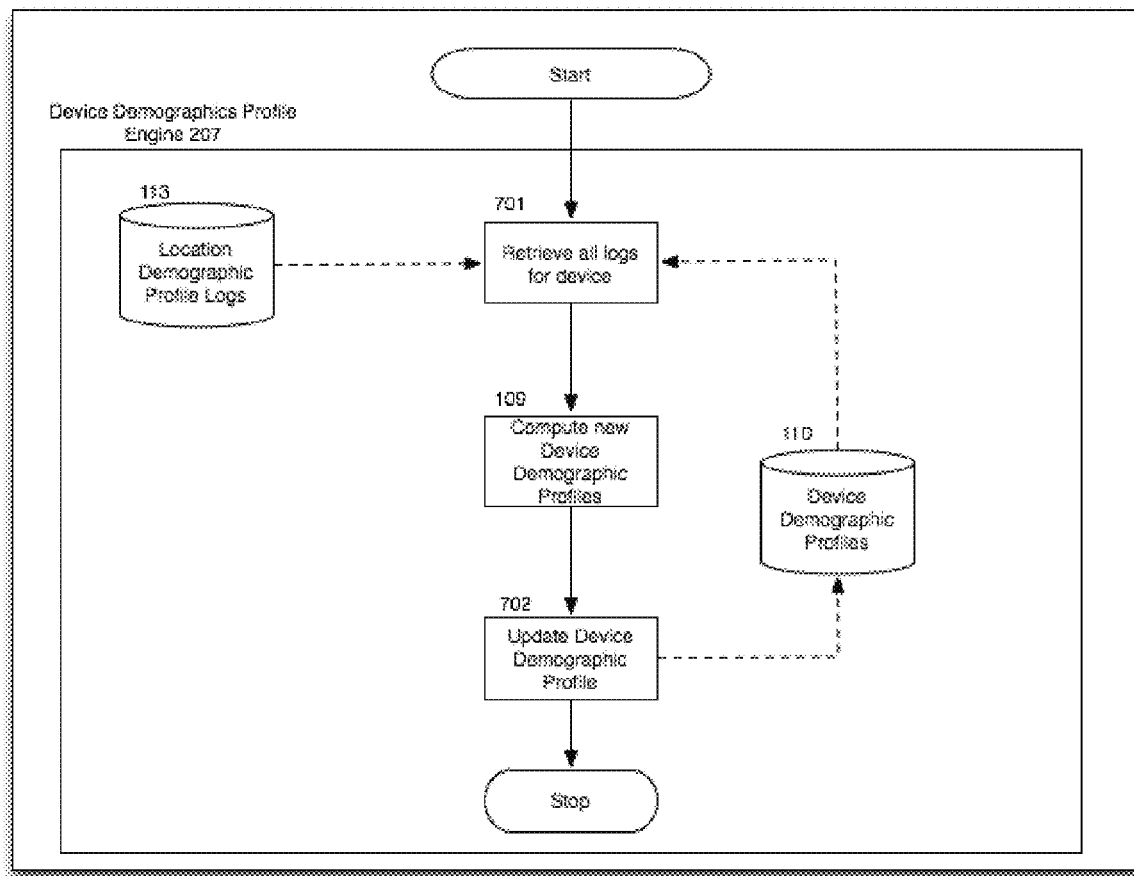
FIG. 7 shows a flow chart of one embodiment of the process to compute the Device Demographic Profiles as deployed according to FIG. 2.

FIG. 7 depicts a process by which the Device Demographic Profiles (DDPs) are computed by the Device Demographic Profile Engine 207. In one embodiment of this invention, the computation of the DDPs is executed on the Mobile Computing Device 201. In FIG. 7, an event such as a new LDP or an external trigger begins the process of computing a new DDP for the device. The process begins by gathering all relevant LDPs that have been logged for the device 701. These may be filtered by different criteria, such as age of reading, day of the week, etc. The logs for the device are then combined using a technique to compute the new DDP 109. One embodiment of the technique chooses all LDPs for the device that were registered between the hours of 10 PM and 5 AM local time for that device. A rudimentary implementation could then average the demographic information contained in all of the LDPs to compute an average DDP. This would presume that the device was near the home location of the owner a majority of the time that it was observed during this time and thus would be strongly influenced by the demographics of that location.

Another embodiment of the technique would cluster similar demographics based on similarity measures and grouped by time. Thus, large clusters could be identified that represent a demographic profile of locations in which the device is often observed. These different clusters could then be categorized based on various factors (e.g. time of day, land use, etc.) to label these DDPs with tags such as 'home' or 'work'.

The clustering techniques are novel in that they cluster demographics within the demographic dimension and time dimension. This differs from methods which relied on the spatial attributes (e.g. location) to provide clustering and distance measures. Computations must include a mechanism to determine 'Demographic Distance' between any two Demographic Profiles. For example, the distance measure could be the normalized sum of differences in ratios across all buckets in all of the attribute classes. A more sophisticated embodiment computes weighted difference based on the number of buckets contained in each attribute class.

Completing the discussion of FIG. 7, once the new DDPs have been computed by 109, this information is stored in the Device Demographic Profiles database 110 (step 702).

Figure 8:
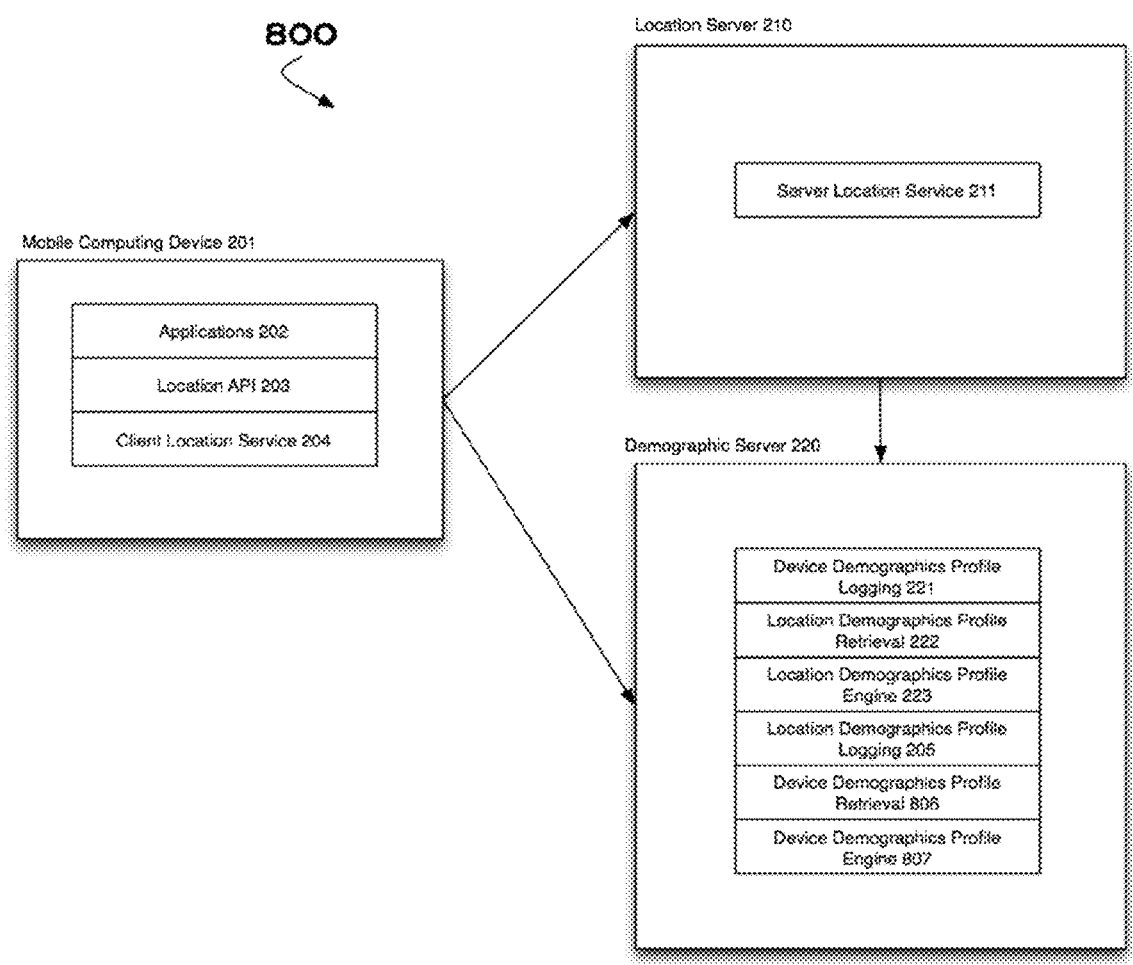
FIG. 8 shows a second embodiment of a deployment of the present invention in which the Mobile Computing Device requires little to no modification.
Figure 9:
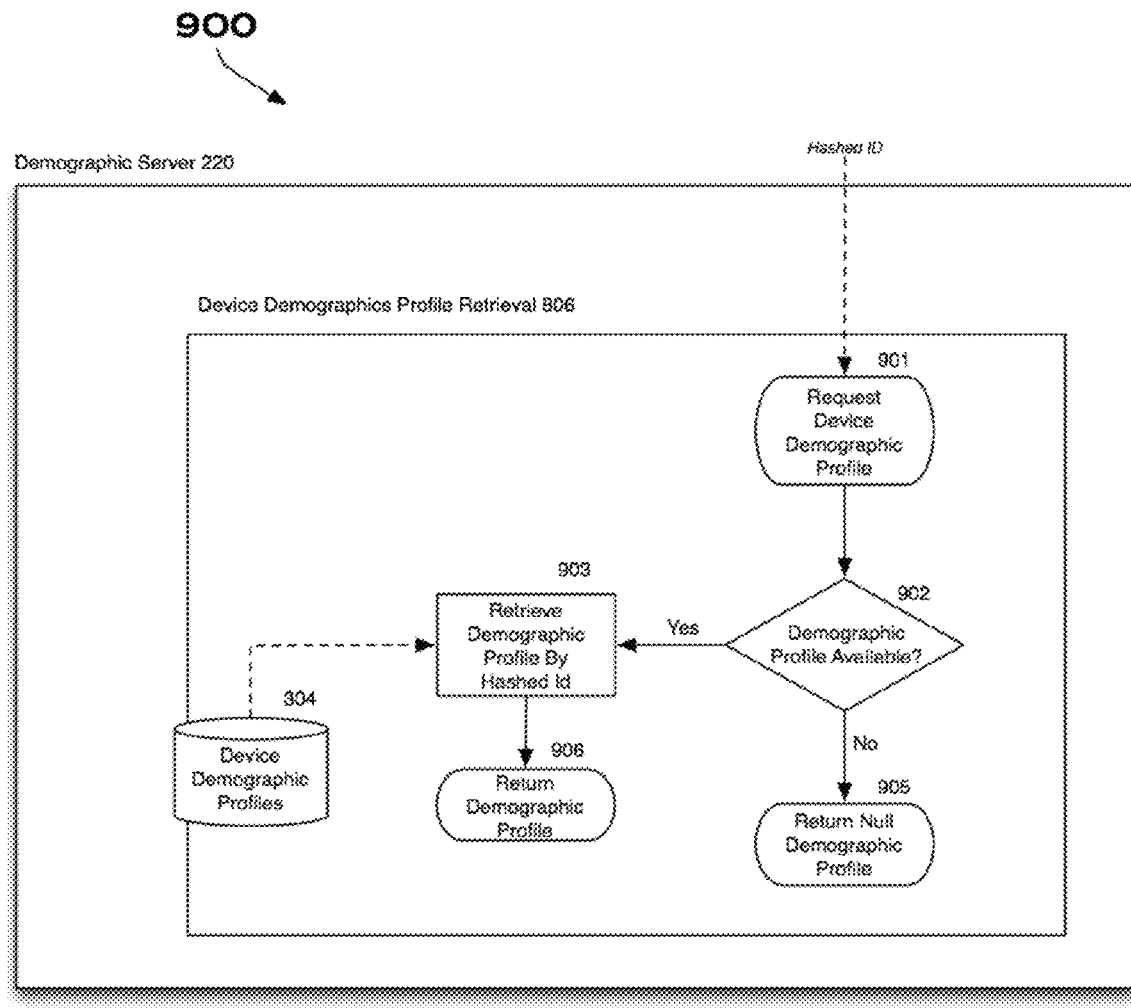
FIG. 9 shows a second embodiment of a detailed example of demographic profile retrieval as deployed on a remote location server as per FIG. 8.
Figure 10:
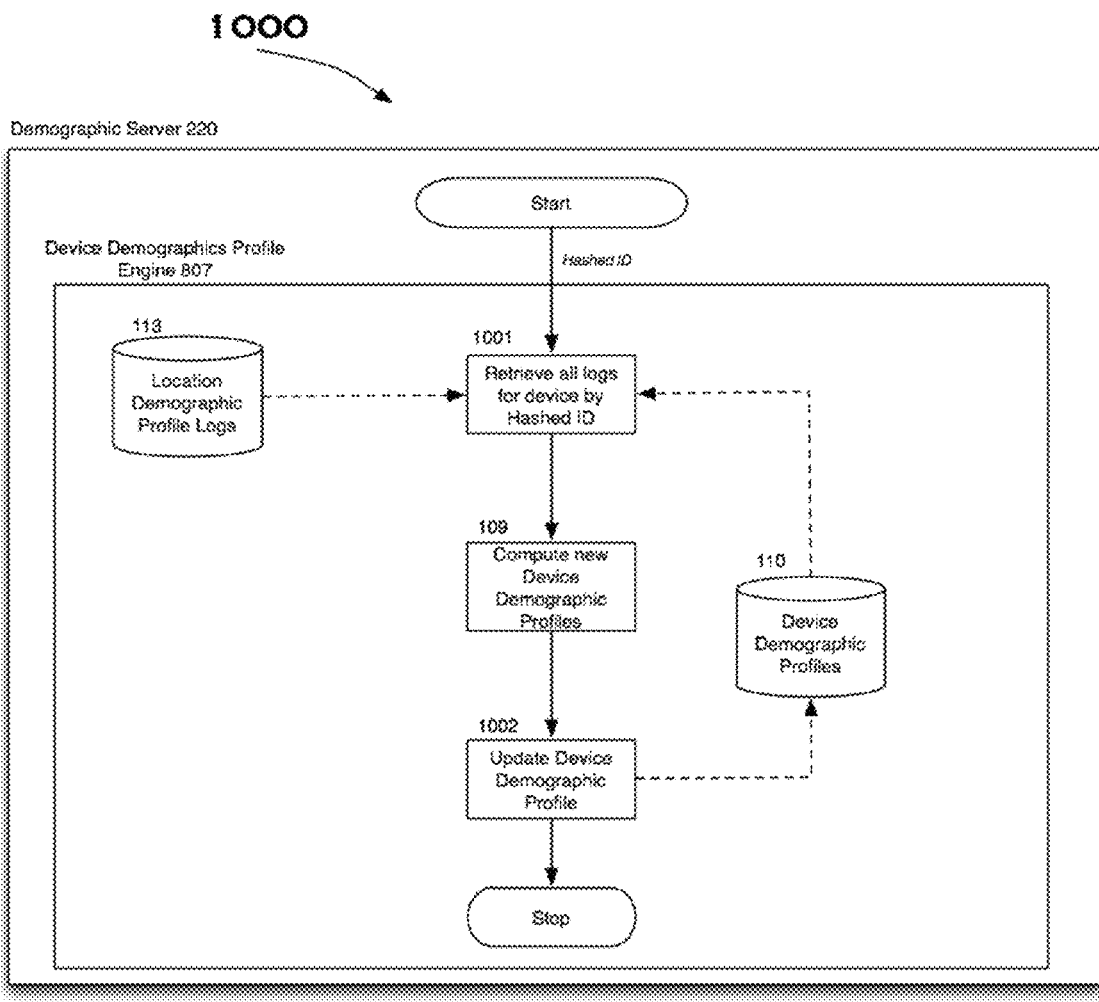
FIG. 10 shows a second embodiment of a flow chart of the process to compute the Device Demographic Profiles as deployed according to FIG. 8.

FIG. 8, FIG. 9, and FIG. 10 depict an alternate embodiment of the invention in which the Device Demographic Profiles (DDPs) are computed and stored on the Location Server 210 rather than the Mobile Computing Device 201. In these instances FIG. 8 is a modified version of FIG. 2, FIG. 9, 900 is a modified version of FIG. 3, and FIG. 10 is a modified version of FIG. 7. One key distinction between these sets of figures is the inclusion of a hashed ID in the process and data flows that identify a device as distinct from all other devices.

FIG. 8 illustrates an embodiment of the invention in which there is a Mobile Computing Device 201 which contains Applications 202. Many applications on mobile devices require location information to be useful or to enhance the functionality of the application. Mobile devices provide a Location API 203 which allows applications to retrieve an estimate of the current location of the device. Additionally the invention, in one embodiment, extends Demographic Server 220 by adding the Location Demographics Profile Logging 205, the Device Demographics Profile Retrieval 806 and Device Demographics Profile Engine 807.

Continuing with FIG. 9, the modified Device Demographic Profile Retrieval 806 is described in a embodiment deployed on the Demographic Server 220. In addition to the request for a DDP, the calling process must include a hashed ID to identify the particular Device that a DDP is being requested for 901. This same information is subsequently required to retrieve the DDP 903. All other steps remain analogous as those described for Device Demographic Profile Retrieval 206.

Continuing with FIG. 10, 1000 depicts the Device Demographic Profile Engine 807 is depicted in a second embodiment whereby the process is located on the Demographic Server 220 rather than the Mobile Computing Device 201. Similar to FIG. 9, the processing required to compute a DDP on the server is a hashed ID which identifies the particular device for which to compute the DDP. This hashed ID will also be used to retrieve the logged LDPs for that device 1001 as well as to update the DDP 1002 upon completion of the computation as performed by step 109 previously described.

Figure 11A:
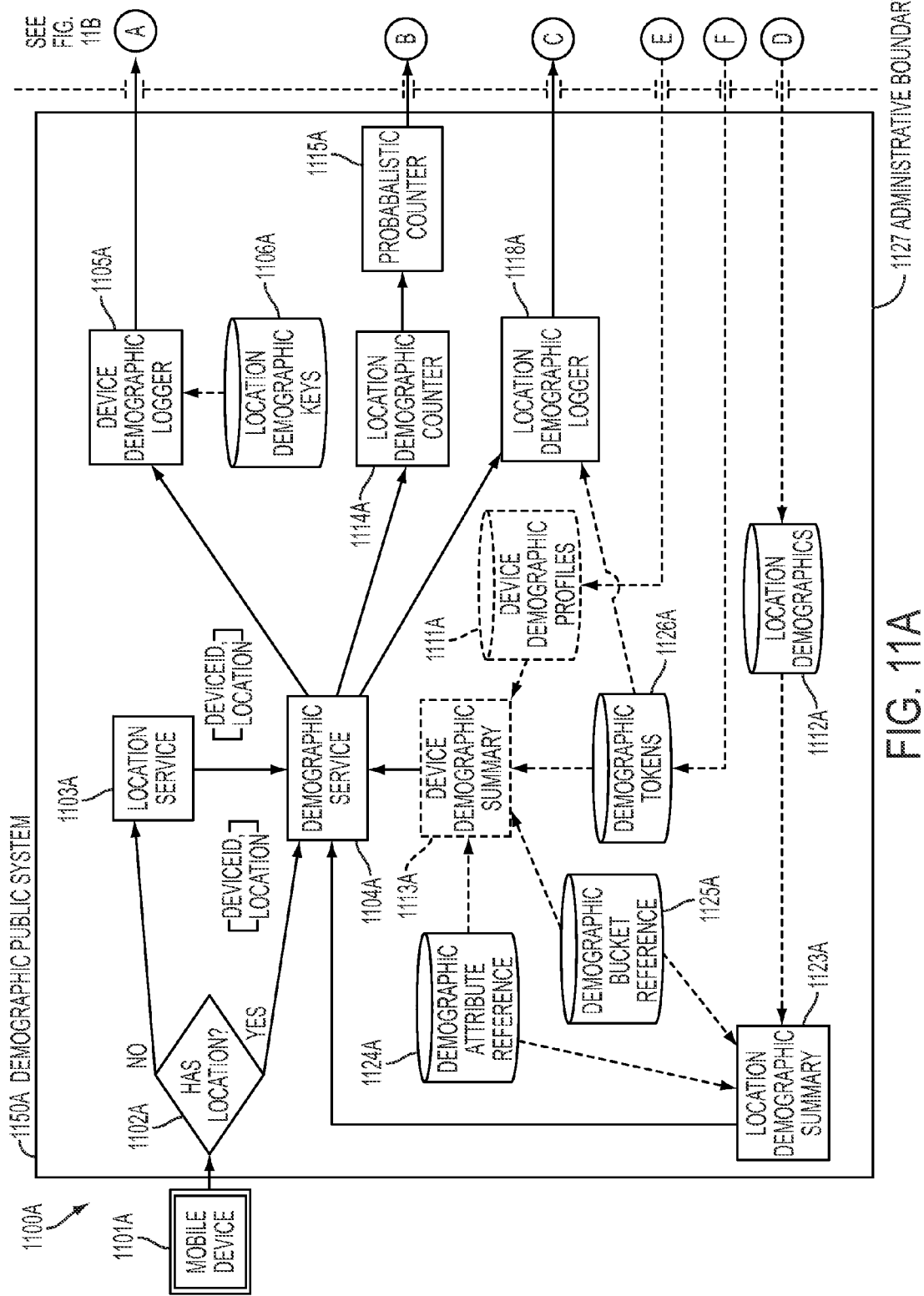
FIGS. 11A and 11B depict an illustrative embodiment of the invention showing aspects of the privacy preserving mechanisms.
Figure 11B:
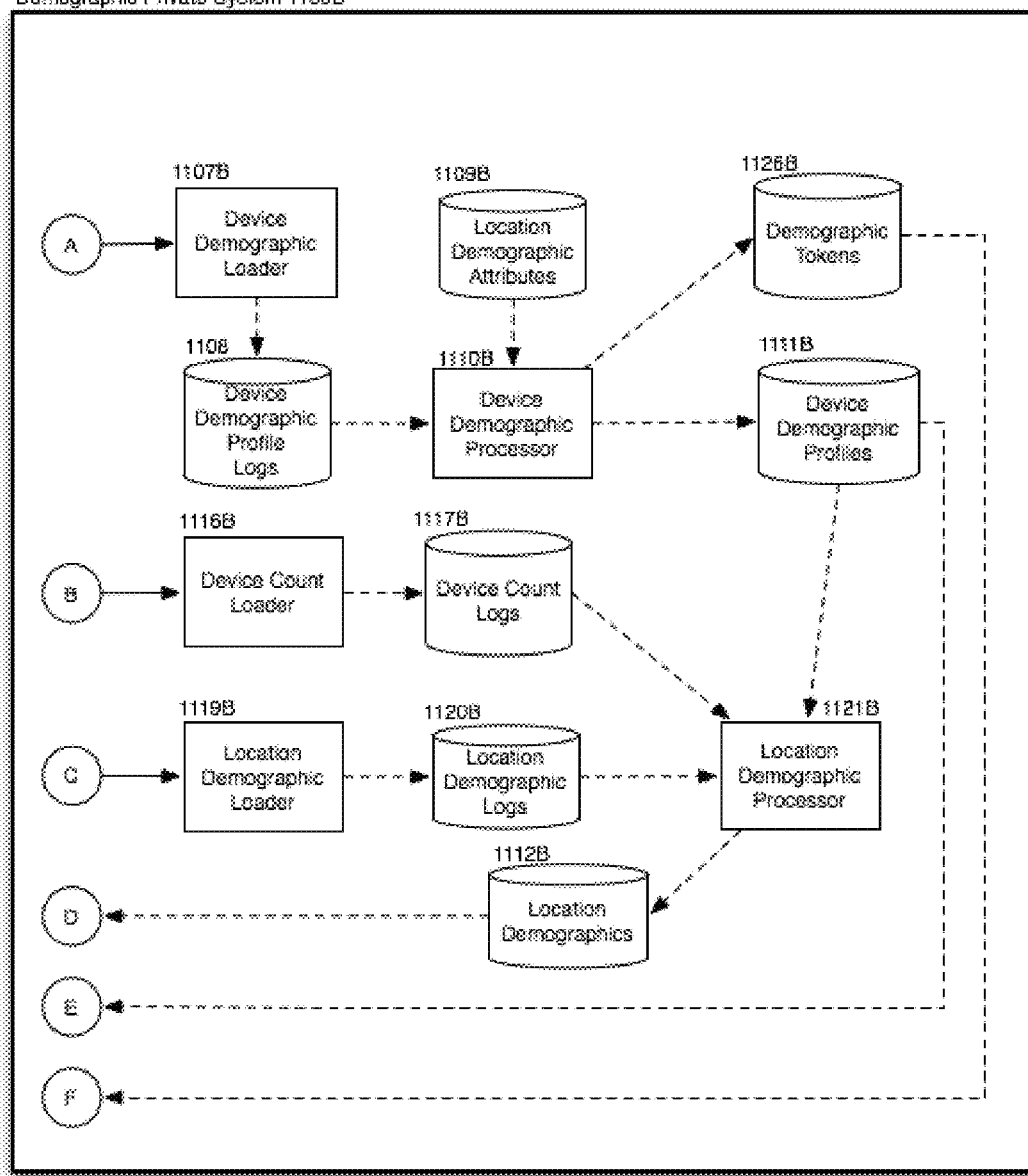

FIG. 11A and FIG. 11B combine to depict an illustrative embodiment of the invention highlighting aspects of the privacy preserving mechanisms. This simplified model shows the data and control flow of one embodiment of the system, highlighting those components which contribute to the privacy preserving capabilities. FIG. 11A represents activity occurring on the Demographic Public System 1150A. FIG. 11B represents activity occurring on the Demographic Private System 1160B. In one embodiment, all actions and data occur on systems independent of Mobile Device 1101A. In particular, the Mobile Device 1101A requests either a Location or Device Demographic Profile or a combination of both from a Location and Demographic Service. The Mobile Device 1101A passes either the location of the device or enough information for the service to compute its location in conjunction with a DeviceID that uniquely identifies the device.

The Demographic Service receives the request and routes it to the Demographic Public System 1150A which determines if location information is present 1102A. If location information is present, the request is routed to the Demographic Service 1104A, otherwise the request is routed to the Location Service 1103A. If the location is not present, the Location Service 1103A will attempt to compute the location of the device. If it cannot determine the location of the device, an empty (or equivalent) response is returned to the Mobile Device 1101A. Otherwise, the request is forwarded to the Demographic Service 1104A along with the newly computed location. Henceforth, all activities continue as if the request had come from the Mobile Device 1101A with location included.

Continuing with FIG. 11A, the information is passed to three independent processes: the Device Demographic Logger 1105A, the Location Demographic Counter 1114A, and the Location Demographic Logger 1118A.

The Device Demographic Logger 1105A provides a number of privacy preserving actions. It converts the DeviceID into a DeviceToken. It also converts the time of request to the local time based on the location of the device. This local time, in certain embodiments, may then be further reduced in specificity, for example by reducing it to indicate only hour of the week information. Other options include a representation of time lacking date information (such as month, day, and/or year) and/or a time range. The Device Demographic Logger 1105A then retrieves the demographic keys for the given location from the Location Demographic Keys 1106A. These keys, the converted request time, and the DeviceToken are then passed over an Administrative Boundary 1127 to the Device Demographic Loader 1107B in FIG. 11B.

The Administrative Boundary 1127 provides additional privacy preserving capabilities. It represents the separation of knowledge such that information available on the Demographic Public System 1150A is not discoverable on the Demographic Private System 1160B. Only the information that is explicitly shared from one side of the boundary to the other is available. For example, the relationship between the DeviceID and the DeviceToken is not discoverable on the Demographic Private System 1160B in FIG. 11B.

Continuing with FIG. 11B, the Device Demographic Loader 1107B generates log records from the input DeviceToken, request time, and Demographic Keys. The output from this process is the Device Demographic Profile Logs 1108B.

The Device Demographic Processor 1110B reads records from the Device Demographic Profile Logs 1108B as well as specific values from the Location Demographic Attributes 1109B based on the Demographic Keys previously logged. The information in the Location Demographics Attributes 1109B represent the values for the demographic attributes, for example, the ratio of people in the given area which are females based on previously known information. All Device Demographic Profile Logs records are gathered for each DeviceToken. Using this set of information, the Device Demographic Processor 1110B will perform various clustering algorithms to compute the most likely set of demographics that represent the Mobile Device for the specified criteria. For example if the 'Home' demographic for the device is requested, the cluster algorithm may choose all demographic log records that occurred between 10 PM and 5 AM to represent the most likely times that a device would be located within the home demographics of the device owner.

Clustering is a common data mining method by which groups of 'like' items are assigned to a set by computing a difference, or 'distance' between items. Cluster analysis can be accomplished with a number of different algorithms based on the specific need. In particular, a cluster of similar demographic records can be found by measuring the difference between two demographic records. Records with similar values can be clustered together. An example would be to measure the difference between all attribute's buckets. If the average value between buckets is less than 0.1, these records would be considered as part of the cluster.

Upon successful clustering by the Device Demographic Processor 1110B, a set of records that represent the computed demographics for the device will be written to the Device Demographic Profiles 1111B database and a relationship between the DeviceToken and the DemographicProfileToken will be stored in the DemographicTokens 1126B database.

Continuing in FIG. 11B, a copy of the Demographic Tokens 1126B database is transferred to the Demographic Public System 1150 in FIG. 11A (at 1126A). The Device Demographic Profiles 1111B are optionally copied to the Demographic Public System 1150A (at 1111A) for use in computing a public version the Device Demographic Summary.

Returning to FIG. 11A, a request by the Mobile Device 1101 will also instigate a process within the Location Demographic Counter 1114A. This process counts the presence of unique devices within a given geographic boundary during a specific time window. For example, it may count the number of devices that appeared in a city block on Monday between 3 PM and 4 PM. Utilizing, for example, a Probabilistic Counter 1115A such as a Bloom Filter, the unique number of devices can be counted without identifying the specific Devices that were counted, thus preserving the privacy of the individual devices that are found to be present at various locations. These counts are then passed to the Device Count Loader 1116B located within the administrative domain of the Demographic Private System 1160B shown in FIG. 11B.

The Device Count Loader 1116B generates records that are stored in the Device Count Logs 1117B database in FIG. 11B.

Returning to FIG. 11A, a request by the Mobile Device 1101 will also instigate a process within the Location Demographic Logger 1118A. This process will convert the DeviceID to a DeviceToken. It will then use this information to find a matching record, if available, within the DemographicTokens database. If present, the record will contain the DemographicToken for the given DeviceToken. The specific location is converted to a geometric shape representing some area larger than the identified point. This process reduces the specificity of the location, providing additional privacy preserving properties. Additionally, the specific time of the request is reduced in a manner similar to that described within the Device Demographic Logger 1105A process to provide additional privacy preserving qualities. The DemographicToken, the location geometry, and the modified time value are then sent to the Location Demographic Loader 1119B within the Demographic Private System 1160B shown in FIG. 11B.

Continuing in FIG. 11B, the Location Demographic Loader 1119B generates records which are stored in the Location Demographic Logs 1120B database.

The Location Demographic Processor 1121B periodically computes the Location Demographic Profiles for each location geometry for which the Location Demographic Logs 1120B database contains information. For each location geometry, the process retrieves records for a specific time frame (e.g. each hour). These records are combined with the Device Demographic Profiles 1111B database to compute the aggregate Location Demographic Profile for that location during that time duration.

For each Location Demographic Logs 1120B record, the associated Device Demographic Profiles 1111B record is retrieved based on the Demographic Token. To combine the demographic information, a number of techniques can be applied. For example, the median of the demographics for each attribute can be chosen. Using median removes outliers and considers the best representative of temporal/spatial demographics. The median can be modified to select a bin with the most number of like records, if they exist. In this case, the most frequently occurring values could be chosen as the result for each attribute and bucket.

An alternative method would be to use the average of demographics, which is calculated by averaging each bucket of each attribute. Other statistical means to compute the combined demographics could be applied (e.g. weighted average based on number of like samples).

The Device Count Logs 1117B are consulted to assist in computing the confidence in the profile based on the number of devices observed within the given location geometry during the time in question. The confidence can be computed based on the total number of samples observed for that location within the time window. This number can be compared to historical sample counts to determine if the sample count is statistically significant. Alternatively, the expected population of the area can be used to compare the sample count to determine the statistical significance of the samples. In one embodiment, the statistical significance would be used as the confidence factor. Other factors, such as the accuracy of the location, or externally available information about the number of mobile device users in the area could be used to compute the confidence factors.

This process is repeated for each demographic attribute and for each desired time span. This results in record for each computation that includes the location geometry, the time span, the confidence factor(s) and values for each computed bucket within the given attribute (e.g. the computed ratio of males and females). These records are then written to the Location Demographic 1112B database.

The Location Demographic database 1112B is copied to the Demographic Public System 1150A depicted in FIG. 11A.

Returning to FIG. 11A, if the Mobile Device 1101A has requested a Location Demographic Profile, the Location Demographic Summary 1123A process is executed for the location that is requested. This process combines information from the Demographic Bucket Reference 1125A database, the Demographic Attribute Reference 1124A database, and the Location Demographics 1112A database to generate a record indicating the computed demographics for a given geographic geometry for the desired time window. The reference tables allow the generic information contained in the Location Demographics 1112A database to be converted back into semantically meaningful demographic attribute and bucket names (e.g. convert from "Table A" to "Education", and "Bucket1" to "Bachelors"). This record is then returned to the Mobile Device 1101A.

Optionally, the Mobile Device 1101A may request its own Device Demographic Summary. If requested, the Device Demographic Summary 1113A process will be executed. This process will convert the DeviceID to a DeviceToken. Using this information, it will retrieve the Device Demographic Profiles 1111A for this device. It will use this information as well as information obtained from the Demographic Tokens 1126A database, the Demographic Bucket Reference 1125A database and the Demographic Attribute Reference 1124A database to generate a record that summarizes the computed demographics for the given device. This record is then returned to the Mobile Device 1101A. Note that providing this optional service reduces the privacy preserving nature of the system. In order to produce the Device Demographic Summary, the Demographic Public System 1150A must have access to the Device Demographic Profiles 1111A database, thus providing a potential for the exposure of this private information.

Figure 12:
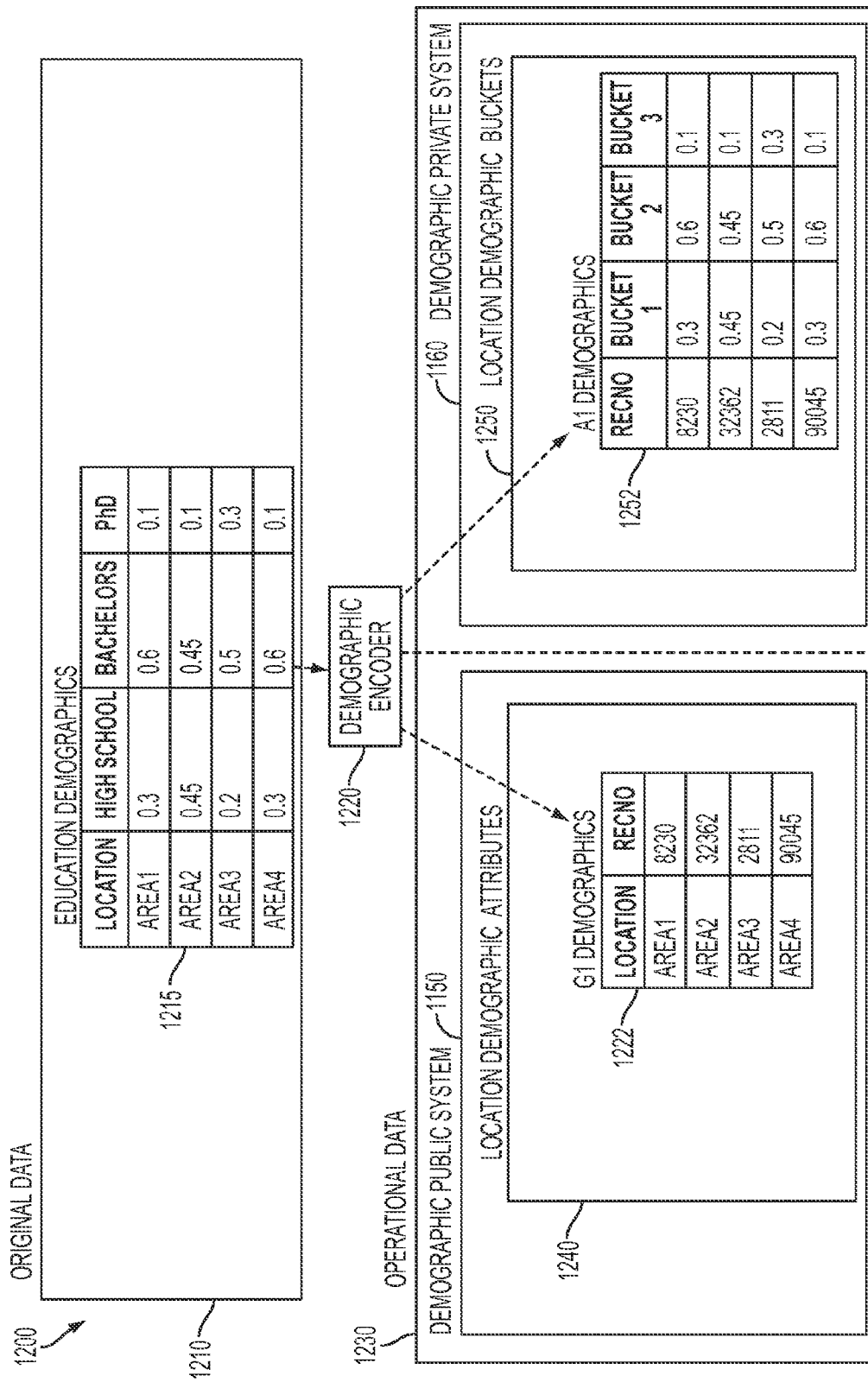
FIG. 12 shows an embodiment of the process to convert demographic data into privacy preserving components.

FIG. 12 shows an embodiment of the process 1200 to convert demographic data into privacy preserving subsets. This process occurs prior to the system being deployed to the Operational Data 1230, and can be processed once for each demographic attribute that should be included in the demographic computations. FIG. 12 shows a specific demographic attribute, the Education Demographics 1215, being converted from the Original Data 1210 into its constituent parts in the Location Demographic Attributes 1240 database and the Location Demographic Buckets 1250 databases.

Continuing with FIG. 12, the Demographic Encoder 1220 reads the Education Demographics 1215 database. For each record, it generates a reference ID, called the Recno. This Recno will serve as the link between the G1 Demographics 1241 database and the A1 Demographics database 1252. The Demographic Encoder 1220 then stores the Location from the Education Demographics 1215 record along with the generated Recno in the G1 Demographics database. It also stores the generated Recno along with the values from the columns in the Education Demographics 1215 database into their respective columns in the A1 Demographics 1252 database. For example, the values in the High School column from the Education Demographics 1215 database will be stored in the Bucket 1 column of the A1 Demographics 1252 database for their respective rows. The extent of the Locations in the Education Demographics 1215 database can be any size and shape that provides a meaningful designation of likely common demographics shared by those within the extent. For example, the Locations can be a neighborhood, a city block, a venue, a small town, or anything on the order thereof.

In addition to splitting the data values between two distinct tables, the relationship between these tables and new column names must be maintained in order to reverse the mapping when processed data is to be returned to the Mobile Device. To encode this mapping, two additional databases are required. The Demographic Attribute Reference 1243 database encodes the mapping from the new table name (e.g. "A1") to the original data table name (e.g. "Education"). The second database, Demographic Bucket Reference 1242, provides the mapping for each bucket or column within an attribute. For example, this allows the system to convert from "Bucket 1" to the semantically meaningful value of "High School".

Continuing with FIG. 12, note that the division of the data is also maintained across the Administrative Boundary 1127. The G1 Demographics 1241 database is contained within the Demographic Public System 1150 while the A1 Demographics 1252 is contained on the Demographic Private System 1160. This division is an example that provides additional privacy preserving properties both by obfuscating the information (e.g. converting recognizable information such as "High School" to generic labels such as "Bucket 1") as well as separation of knowledge (e.g. the relationship of Recno to Area is only known by the Demographic Public System 1150, while the relationship of Recno to attribute buckets is only known by the Demographic Private System 1160.

Figure 13A:
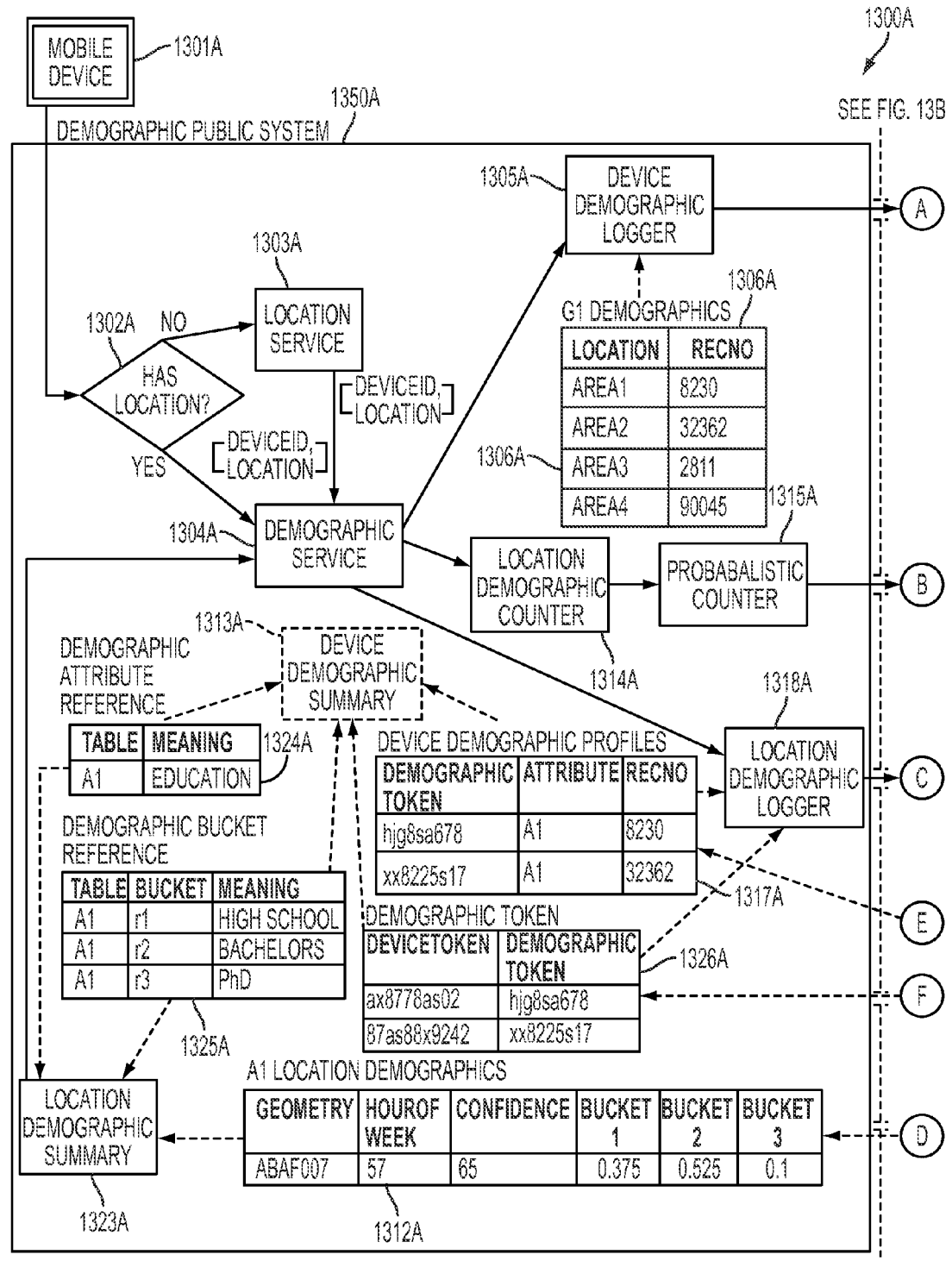
FIG. 13A represents the Demographic Public System and FIG. 13B represents the Demographic Private System.
Figure 13B:
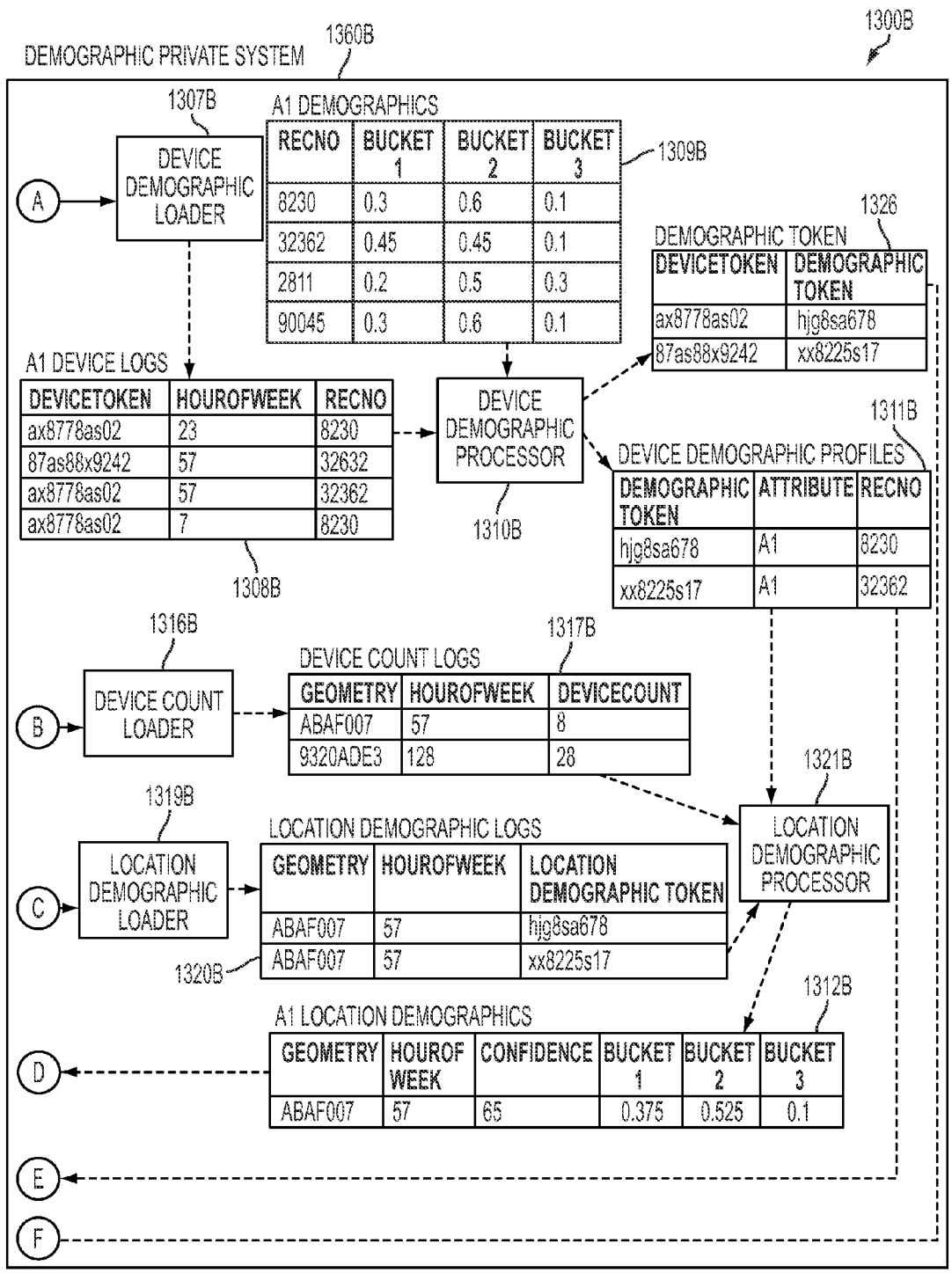

FIG. 13A and FIG. 13B show an instance of FIG. 11A and FIG. 11B containing additional detail with respect to the data elements used for privacy preserving purposes. In particular, FIG. 13A and FIG. 13B depict an embodiment of the system in which the abstract database icons and names from FIG. 11A and FIG. 11B have been replaced with specific instances of tables and data to provide more concrete examples of the privacy preserving features. In particular, it depicts a single demographic attribute, "Education" and the attribute buckets of "High School", "Bachelors", and "PhD".

In FIG. 13A, the Mobile Device 1301A requests either a Location or Device Demographic Profile or a combination of both from a Location and Demographic Service 1300A. The Mobile Device 1301A passes either the location of the device or enough information for the service to compute its location in conjunction with a DeviceID.

The Demographic Service 1300A receives the request and routes it to the Demographic Public System 1350A which determines if location information is present via 1302A. If location information is present, the request is routed to the Demographic Service 1304A, otherwise the request is routed to the Location Service 1303A. If the location is not present, the Location Service 1303A will attempt to compute the location of the device. If it cannot determine the location of the device, an empty (or equivalent) response is returned to the Mobile Device 1301A. Otherwise, the request is forwarded to the Demographic Service 1304A along with the newly computed location. Henceforth, all activities continue as if the request had come from the Mobile Device 1301A with location included.

Continuing with FIG. 13A, the information is passed to three independent processes: the Device Demographic Logger 1305A, the Location Demographic Counter 1314A, and the Location Demographic Logger 1318A.

The Device Demographic Logger 1305A provides a number of privacy preserving actions. It converts the DeviceID into a DeviceToken. It also converts the time of request to the local time based on the location of the device. This local time, in certain embodiments, may then be further reduced in specificity, for example by reducing it to indicate only hour of the week information. The Device Demographic Logger 1305A then retrieves the demographic keys for the given location from the G1 Demographics 1306A database. For example, assume the request was received by a location within "Area1", the resulting key (e.g. Recno) would be "8230". This Recno, the converted request time, and the DeviceToken are then passed over an Administrative Boundary 1327A to the Device Demographic Loader 1307B shown in FIG. 13B.

The Administrative Boundary 1327A provides additional privacy preserving capabilities. It represents the separation of knowledge such that information available on the Demographic Public System 1350A is not discoverable on the Demographic Private System 1360B in FIG. 13B. Only the information that is explicitly shared from one side of the boundary to the other is available. For example, the relationship between the DeviceID and the DeviceToken is not discoverable on the Demographic Private System 1360B.

Referring to FIG. 13B, the Device Demographic Loader 1307B generates log records from the input DeviceToken, request time, and Demographic Keys. The output from this process is the A1 Device Logs 1308B. Each record contains the DeviceToken, the HourOfWeek, and the Recno as sent by the Device Demographic Logger 1305A from FIG. 13A.

Continuing with FIG. 13B, the Device Demographic Processor 1310B reads records from the A1 Device Logs 1308B as well as specific values from the A1 Demographics 1309B based on the Demographic Keys previously logged. The information in the A1 Demographics 1309B represent the values for the buckets within the "A1" demographic attribute. All Device Demographic Profile Logs records are gathered for each DeviceToken. Using this set of information, the Device Demographic Processor 1310B will perform various clustering algorithms to compute the most likely set of demographics that represent the Mobile Device for the specified criteria. For example if the 'Home' demographic for the device is requested, the cluster algorithm may choose all demographic log records that occurred between 10 PM and 5 AM to represent the most likely times that a device would be located within the home demographics of the device owner.

Upon successful clustering by the Device Demographic Processor 1310B, a set of records that represent the computed demographics for the device will be written to the Device Demographic Profiles 1311B database and a relationship between the DeviceToken and the DemographicProfileToken will be stored in the Demographic Token 1326B database. Examples of this output are depicted in the respective databases in FIG. 13B. In particular, it is noted that DeviceToken "ax8778as02" is connected to the Recno "8230" via this relationship as indicated in FIG. 13B.

Continuing in FIG. 13B, a copy of the Demographic Token 1326B database is transferred to the Demographic Public System 1350A depicted on FIG. 13A (as 1326A). The Device Demographic Profiles 1311B database is optionally copied to the Demographic Public System 1350A, shown in FIG. 13A, for use in computing a public version the Device Demographic Summary (as 1311A).

Returning to FIG. 13A, a request by the Mobile Device 1301A will also instigate a process within the Location Demographic Counter 1314A. This process counts the presence of unique devices within a given geographic boundary during a specific time window. For example, it may count the number of devices that appeared in a city block on Monday between 3 PM and 4 PM. Utilizing, for example, a Probabilistic Counter 1315A such as a Bloom Filter, the unique number of devices can be counted without identifying the specific Devices that were counted, thus preserving the privacy of the individual devices that are found to be present at various locations. These counts are then passed to the Device Count Loader 1316B located within the administrative domain of the Demographic Private System 1360B depicted in FIG. 13B.

Continuing with FIG. 13B, the Device Count Loader 1316B generates records that are stored in the Device Count Logs 1317B database. For example, referring to FIG. 13B that for Geometry "ABAF007" and hour 57 of the week, there were 8 distinct devices counted.

Returning to FIG. 13A, a request by the Mobile Device 1301A will also instigate a process within the Location Demographic Logger 1318A. This process will convert the DeviceID to a DeviceToken. It will then use this information to find a matching record, if available, within the DemographicTokens database 1326A. If present, the record will contain the DemographicToken for the given DeviceToken. The specific location is converted to a geometric shape representing some area larger than the identified point. This process reduces the specificity of the location, providing additional privacy preserving properties. Additionally, the specific time of the request is reduced in a manner similar to that described within the Device Demographic Logger 1305A process to provide additional privacy preserving qualities. The Demographic Token, the location geometry, and the modified time value are then sent to the Location Demographic Loader 1319B within the Demographic Private System 1360B shown in FIG. 13B.

Continuing in FIG. 13B, the Location Demographic Loader 1319B generates records which are stored in the Location Demographic Logs 1320B database.

The Location Demographic Processor 1321B periodically computes the Location Demographic Profiles for each location geometry for which the Location Demographic Logs 1320B database contains information. For each location geometry, the process retrieves records for a specific time frame (e.g. each hour). These records are combined with the Device Demographic Profiles 1311B database to compute the aggregate Location Demographic Profile for that location during that time duration. The Device Count Logs 1317B are consulted to assist in computing the confidence in the profile based on the number of devices observed within the given location geometry during the time in question. This process is repeated for each demographic attribute and for each desired time span. This results in a record for each computation that includes the location geometry, the time span, the confidence factor(s) and values for each computed bucket within the given attribute. These records are then written to the A1 Location Demographics 1312B database. Referring to FIG. 13B, there is a single entry in A1 Location Demographics 1312B database representing the computed values for demographic attribute "A1" at location geometry "ABAF007" for the 57th hour of the week.

The A1 Location Demographics database 1312B is copied to the Demographic Public System 1350B (as 1312A) shown in FIG. 13A.

Returning to FIG. 13A, if the Mobile Device 1301A has requested a Location Demographic Profile, the Location Demographic Summary 1323A process is executed for the location that was requested. This process combines information from the Demographic Bucket Reference 1325A database, the Demographic Attribute Reference 1324A database, and the Location Demographics 1312A database to generate a record indicating the computed demographics for a given geographic geometry for the desired time window. The reference tables allow the generic information contained in the A1 Location Demographics 1312A database to be converted back into semantically meaningful demographic attribute and bucket names. This record is then returned to the Mobile Device 1301A.

Figure 14:
FIG. 14 depicts an embodiment of a partial output of the Location Demographic Profile for an illustrative geographic geometry.

FIG. 14 depicts an example output 1400 based for an Location Demographic Profile produced by the system shown in FIG. 13A and FIG. 13B. This represents a partial demographic profile 1401 based on the limited example data contained in the figure.

Optionally, the Mobile Device 1301A may request its own Device Demographic Summary. If requested, the Device Demographic Summary 1313A process will be executed. This process will convert the DeviceID to a DeviceToken. Using this information, it will retrieve the Device Demographic Profiles 1312A for this device. It will use this information as well as information obtained from the Demographic Token 1326A database, the Demographic Bucket Reference 1325A database and the Demographic Attribute Reference 1324A database to generate a record that summarizes the computed demographics for the given device. This record is then returned to the Mobile Device 1301A. Note that providing this optional service reduces the privacy preserving nature of the system. In order to produce the Device Demographic Summary, the Demographic Public System 1350A must have access to the Device Demographic Profiles 1311A database, thus providing a potential for the exposure of this private information.

In the foregoing description, certain steps or processes were described as being performed on particular servers or as part of a particular engine. These descriptions are merely illustrative, as the specific steps can be performed on various hardware devices, including, but not limited to, server systems and/or mobile devices. Similarly, the division of where the particular steps are performed in the above description illustrates certain embodiments, if being understood that no division or a different division is within the scope of the invention.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention.

The invention claimed is:

1. A method of estimating demographic information associated with a user of a mobile device while preserving privacy of the user based at least in part on a location estimate of the mobile device of the user, the method comprising:
   (a) receiving an estimated geographical location of the mobile device of the user;
   (b) receiving a time at which the mobile device was at the estimated geographical location;
   (c) providing a set of substitute identifiers for a corresponding set of at least one geographical area;
   (d) assigning one of the set of substitute identifiers for a geographical area corresponding to the estimated geographical location of the mobile device;
   (e) assigning a substitute identifier for the time at which the mobile device was at the estimated geographical location;
   (f) retrieving, from a non-transitory computer readable medium, demographic information corresponding to the substitute identifier for the geographical area and the substitute identifier for the time; and
   (g) forming a device demographic profile based on the demographic information corresponding to the substitute identifier for the geographical area and the substitute identifier for the time,
   wherein the demographic profile stores statistics of the mobile device that serve as demographic information for the user of the mobile device.

2. The method of claim 1, further comprising (h) estimating the received geographical location associated with the mobile device of the user.

3. The method of claim 1, further comprising (h) recording the device demographic profile in a device demographic profile log.

4. The method of claim 3, further comprising (i) estimating demographic information associated with at least one geographical area of the set of geographical areas based on demographic information recorded in the device demographic profile log, wherein the device demographic profile log contains a plurality of device demographic profiles.

5. The method of claim 1, further comprising (h) sending the estimated demographic information associated with the user of the mobile device to the mobile device.

6. The method of claim 1, wherein the substitute identifier for the geographical area corresponding to the geographical location of the mobile device that is assigned identifies a particular set of demographic information.

7. The method of claim 1, wherein the substitute identifier for the geographical area corresponding to the geographical location of the mobile device that is assigned is reduced in specificity relative to the estimated geographical location of the mobile device.

8. The method of claim 1, wherein the substitute identifier for the time at which the mobile device was at the estimated geographic location is a measure of time that is reduced in specificity relative to the time that was received.

9. The method of claim 8, wherein the substitute identifier for the time at which the mobile device was at the estimated geographic location is at least one of (A) a representation of time lacking date information, (B) a time range, and (C) an hour of a week designation.

10. The method of claim 1, wherein the estimating demographic information associated with the user of the mobile device is performed on a separate computer system from a computer system performing any one or more of steps (a) through (e).

11. The method of claim 10, wherein the separate computer system, relative to the computer system performing any one or more of steps (a) through (e), is as least one of (A) maintained in a separate network, (B) maintained in a separate building, and (C) maintained by a separate operational entity.

12. An computing system configured to estimate demographic information associated with a user of a mobile device while preserving privacy of the user based at least in part on a location estimate of the mobile device of the user, the method comprising:
- a location server configured to determine an estimated geographical location of the mobile device of the user; and
- a demographic server including:
  - a device demographics profile logging module configured to receive a time at which the mobile device was at the estimated geographical location, assign a substitute identifier for a geographical area corresponding to the estimated geographical location of the mobile device, and assign a substitute identifier for the time at which the mobile device was at the estimated geographical location,
  - a location demographics profile retrieval module configured to retrieve demographic information corresponding to the substitute identifier for the geographical area and the substitute identifier for the time, and
  - a location demographics profile engine configured to form a device demographic profile based on demographic information corresponding to the substitute identifier for the geographical area and the substitute identifier for the time,
- wherein the demographic profile stores statistics of the mobile device that serve as demographic information for the user of the mobile device.

13. The computing system of claim 12, wherein the demographic server further comprises a storage device storing a device demographic profile log in which the device demographic profile associated with the user of the mobile device is recorded.

14. The computing system of claim 12, wherein the location demographics profile engine is further configured to adjust the demographic information corresponding to the substitute identifier for the geographical area and the substitute identifier for the time based on device demographic profiles associated with users of a plurality of mobile devices that visited the geographical area.

15. The computing system of claim 12, wherein the location demographics profile engine is further configured to send the device demographic profile to the mobile device.

16. The computing system of claim 12, wherein the substitute identifier for the geographical area corresponding to the geographical location of the mobile device is reduced in specificity relative to the estimated geographical location of the mobile device.

17. The computing system of claim 12, wherein the substitute identifier for the time at which the mobile device was at the estimated geographic location is a measure of time that is reduced in specificity relative to the time that was received.

18. A non-transitory computer readable medium having executable instructions stored thereon, the executable instruction when executed by one or more processors of one or more computing systems operable to:
- determine an estimated geographical location of a mobile device of a user;
- determine a time at which the mobile device was at the estimated geographical location;
- assign a substitute identifier for a geographical area corresponding to the estimated geographical location of the mobile device;
- assign a substitute identifier for the time at which the mobile device was at the estimated geographical location;
- retrieve demographic information corresponding to the substitute identifier for the geographical area and the substitute identifier for the time; and
- form a device demographic profile based on the demographic information corresponding to the substitute identifier for the geographical area and the substitute identifier for the time,
- wherein the demographic profile stores statistics of the mobile device that serve as demographic information for the user of the mobile device.

19. The non-transitory computer-readable medium of claim 18, wherein the executable instructions when executed are further operable to:
- adjust the demographic information corresponding to the substitute identifier for the geographical area and the substitute identifier for the time based on device demographic profiles associated with users of a plurality of mobile devices that visited the geographical area.

* * * * *